United States Patent [19]
Nakane

[11] Patent Number: 5,521,891
[45] Date of Patent: May 28, 1996

[54] SPEED DETECTION APPARATUS, SPEED CONTROL MOTOR, AND TRACK JUMP CONTROL CIRCUIT

[75] Inventor: Hiroshi Nakane, Yokohama, Japan

[73] Assignee: Kabushiki Kaisha Toshiba, Kawasaki, Japan

[21] Appl. No.: 323,577

[22] Filed: Oct. 17, 1994

Related U.S. Application Data

[63] Continuation of Ser. No. 501,734, Mar. 30, 1990, abandoned.

[30] Foreign Application Priority Data

Mar. 31, 1989 [JP] Japan ........................... 1-81956
Mar. 31, 1989 [JP] Japan ........................... 1-81959
Mar. 31, 1989 [JP] Japan ........................... 1-81976

[51] Int. Cl.⁶ .................................................. G11B 7/00
[52] U.S. Cl. ..................... 369/44.28; 369/32; 369/44.35; 369/44.25; 369/58; 369/43; 360/77.02; 360/78.06; 360/78.04; 318/560
[58] Field of Search .................. 369/43, 32, 58, 369/44.11, 44.25, 44.27, 44.28, 44.29, 44.35; 360/78.01, 78.04–78.12, 77.02; 318/560

[56] References Cited

U.S. PATENT DOCUMENTS

| | | | |
|---|---|---|---|
| 4,322,712 | 3/1982 | Yoshida | 318/327 |
| 4,748,607 | 5/1988 | Nakane | 369/32 |
| 4,931,889 | 6/1990 | Osafune | 369/32 |
| 5,016,216 | 5/1991 | Horie et al. | 369/32 |
| 5,087,997 | 2/1992 | Osada et al. | 369/32 |

FOREIGN PATENT DOCUMENTS

| | | |
|---|---|---|
| 0077403 | 4/1983 | European Pat. Off. |
| 0146906 | 7/1985 | European Pat. Off. |
| 0176185 | 4/1986 | European Pat. Off. |
| 0209853 | 1/1987 | European Pat. Off. |
| 0218572 | 4/1987 | European Pat. Off. |
| 0357044 | 3/1990 | European Pat. Off. |
| 0356939 | 3/1990 | European Pat. Off. |
| 3520189 | 12/1986 | Germany. |
| 59-152565 | 8/1984 | Japan. |
| 59-171080 | 9/1984 | Japan. |
| 61-276133 | 12/1986 | Japan. |
| 62-89282 | 4/1987 | Japan. |

OTHER PUBLICATIONS

"Videorecorder–Technik, Grundlagen, Schaltungstechnik und Service", Friedrich Manz, 1987, pp. 92–93 and 102–103.
Patent Abstracts of Japan, vol. 9, No. 26, (p-332)[1749], Feb. 5, 1985 based on JP-A-59-171080.
Patent Abstracts of Japan, vol. 11, No. 137, (P-572)[2584], May 2, 1987, based on JP-A-61-276133.

*Primary Examiner*—Tommy P. Chin
*Assistant Examiner*—Khoi Truong
*Attorney, Agent, or Firm*—Oblon, Spivak, McClelland, Maier & Neustadt

[57] ABSTRACT

A track jump control circuit comprises: a head; a rotary motor which drives the head and is controlled in accordance with an input signal; a unit for detecting a speed of rotation corresponding to the rotation of the rotary motor; distance detection unit for producing a signal corresponding to a distance which the head should move with using no data read by the head when the head is moved to a desired position; speed setting unit for setting a speed of movement of the head based on the signal produced by the distance detection unit; and a unit for comparing a speed detected by the speed detection unit with a speed set by the speed setting unit to produce an output as the input signal to the rotary motor.

15 Claims, 25 Drawing Sheets

FIG. 10a  H1 
FIG. 10b  H2 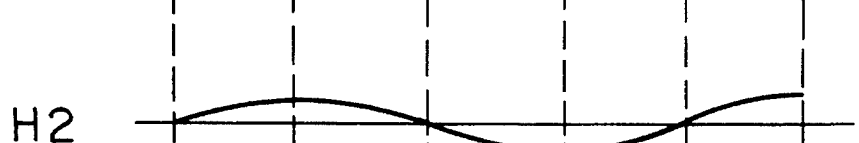
FIG. 10c  VT1 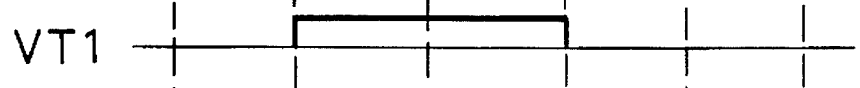
FIG. 10d  VT2 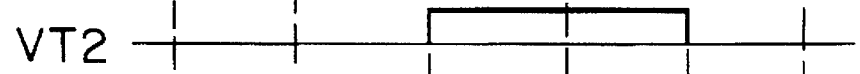
FIG. 10e  VC1 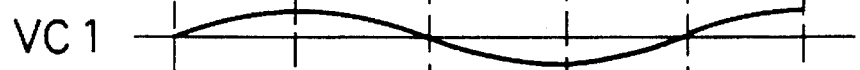
FIG. 10f  VC2 
FIG. 10g  VG1 
FIG. 10h  VG2 
FIG. 10i  VOT 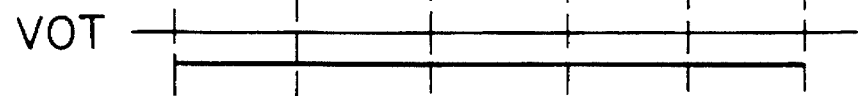

FIG. 11a H1
FIG. 11b H2
FIG. 11c VT1
FIG. 11d VT2
FIG. 11e S1
FIG. 11f S2
FIG. 11g S3
FIG. 11h TRANSISTOR 119a
FIG. 11i TRANSISTOR 121a
TRANSISTOR 119b
FIG. 11j TRANSISTOR 121b

FIG. 14
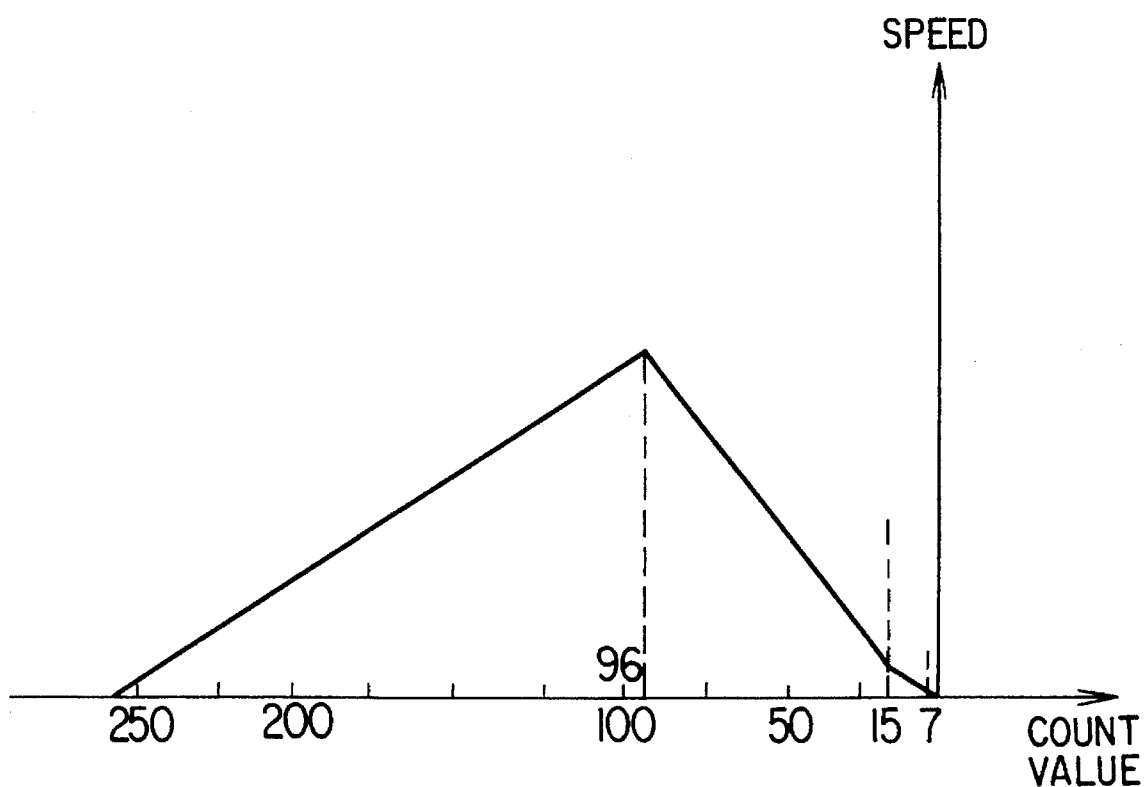
FIG. 15
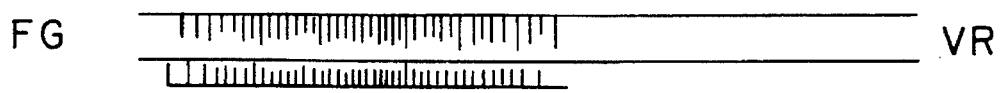

FIG. 16
FG —— VR
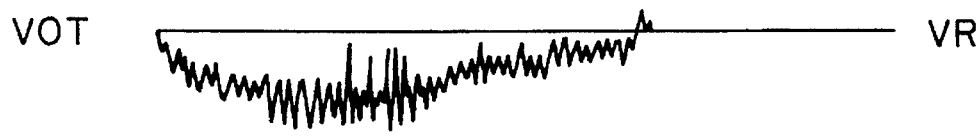
VOT —— VR
270m sec
FIG. 17
| | WHILE THE MOTOR IS IN ROTATION | STOPPAGE OF THE MOTOR |
VT1
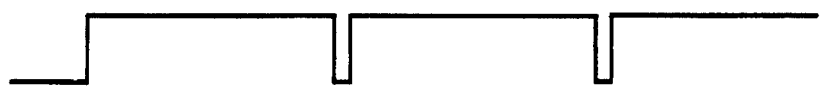
Vμ
Vd
STOP
CONTROL READ TIMING
RESULT OF READ     H     H     L FIG. 26a  H1
FIG. 26b  H2
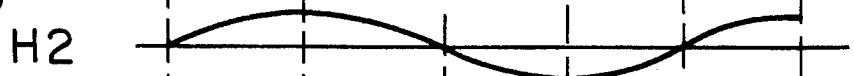
FIG. 26c  VT1
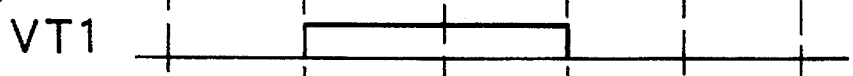
FIG. 26d  VT2
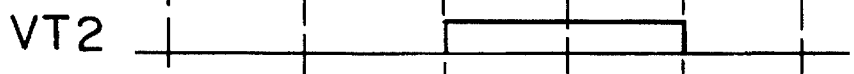
FIG. 26e  VD1
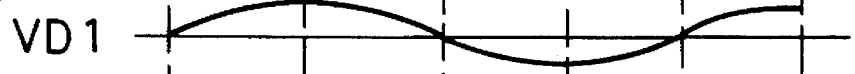
FIG. 26f  VD2
FIG. 26g  VG1
FIG. 26h  VG2
FIG. 26i  VOT
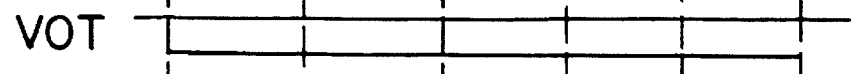

FIG. 27a HI1 OUTPUT
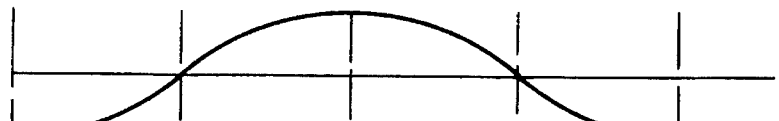
FIG. 27b HI2 OUTPUT
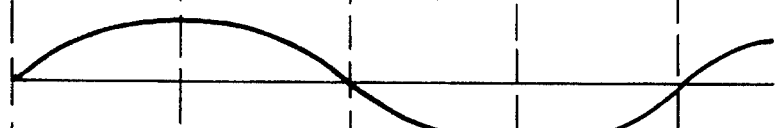
FIG. 27c VT1
FIG. 27d VT2
FIG. 27e VD1
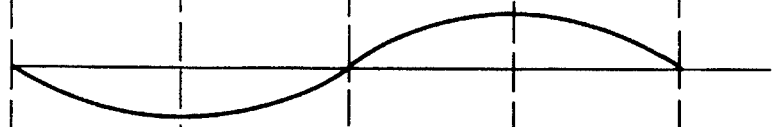
FIG. 27f VD2
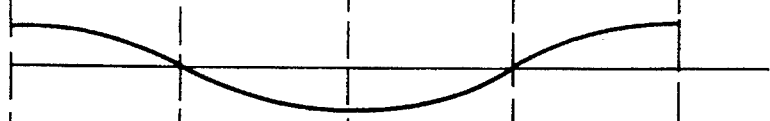
FIG. 27g VG1
FIG. 27h VG2
FIG. 27i VOT

FIG. 30
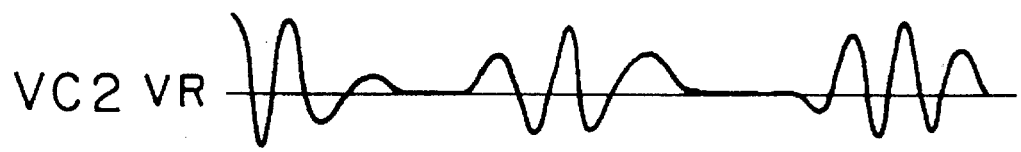
VC2 VR
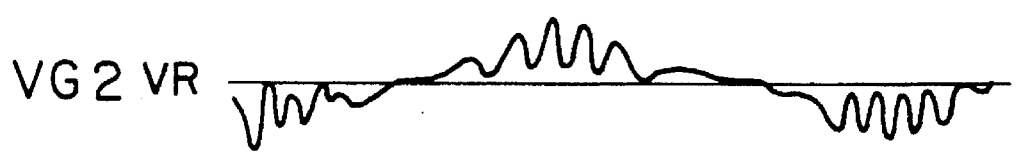
VG2 VR
CW ←|→ CCW ←|→ CW
FIG. 31
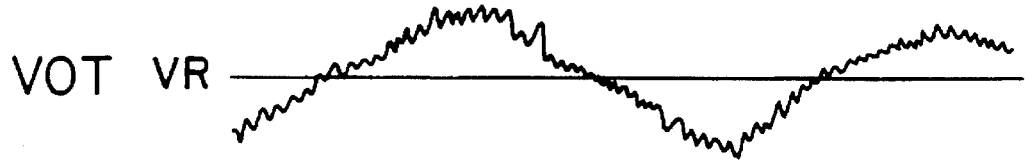
VOT VR
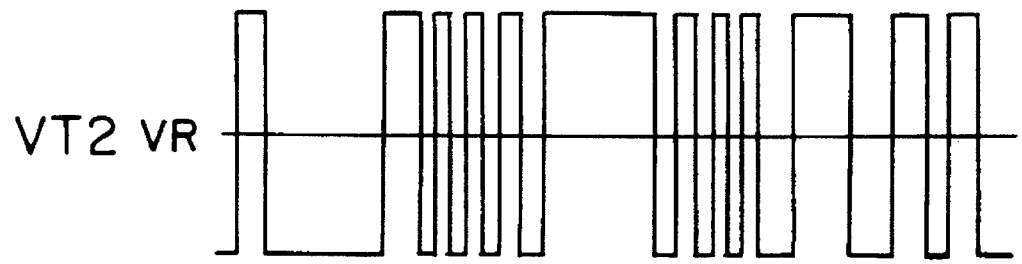
VT2 VR
|→ CCW ←|→ CW ←|→ CCW

FIG. 34
VD2 VR 
VD1 VR 
FIG. 35
VT2 VR 
VG1 VR 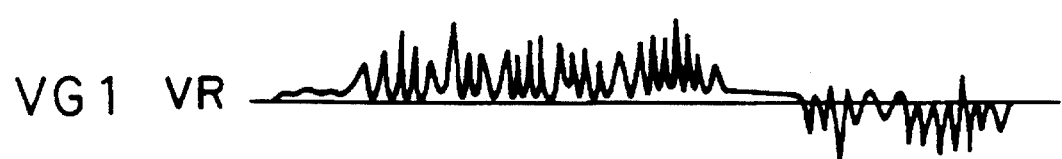
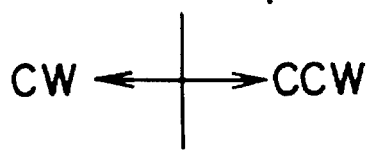

FIG. 36
VG2 VR 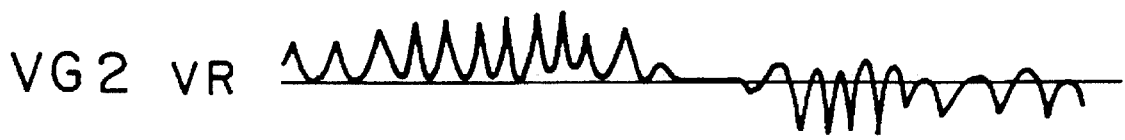
VG1 VR 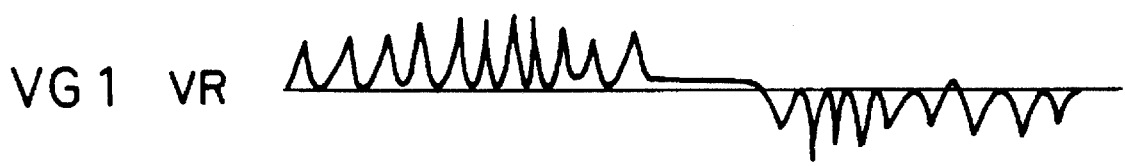
CW ←—→ CCW
FIG. 37
VT1 VR 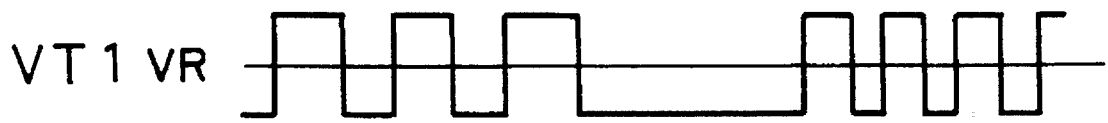
VOT VR 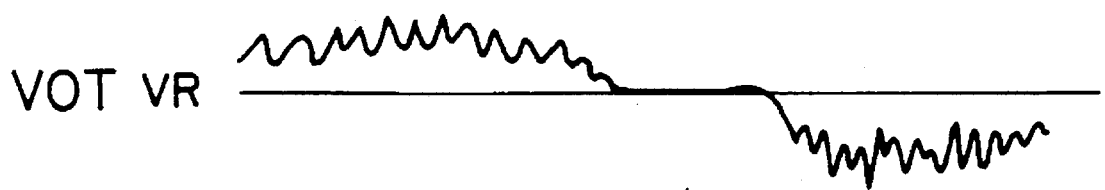
CW ←—→ CCW

SPEED DETECTION APPARATUS, SPEED CONTROL MOTOR, AND TRACK JUMP CONTROL CIRCUIT

This application is a continuation of application Ser. No. 07/501,734, filed on Mar. 30, 1990, now abandoned.

BACKGROUND OF THE INVENTION

1. Field of the Invention

This invention relates to a track jump control circuit for use, e.g., in compact disc (CD) players and a speed detector and speed control motor to be used for this track jump control circuit.

2. Description of the Related Art

As is known well, a disc reproducing device for CD players, video disc players and the like has a so-called search function whereby a desired portion of the disc can be searched based on a signal of recorded data. This search function is performed by causing a pickup for reading the data signal recorded on the disc to move in the radial direction of the disc at high speeds, or to jump over the tracks.

A track jump system of this type includes those disclosed in Japanese Patent Unexamined Publications Nos. 89282/1987, 276133/1986, 152565/1984, and 171080/1984.

The track jump system disclosed in the latter two patent publications performs the track jump function by counting the track signal recorded on the disc.

However, this type of system may sometimes not allow track detection with shorter track jump times because the frequency of transversing or jumping over the tracks nears that of the recording frequency. Any defects or stains also hamper correct reading of track signals, thereby leading to errors in counting the number of tracks. Vibrations to the device itself, inducing an out-of-focus error, may also result in erroneous tracking counts.

Both Japanese Patent Unexamined Publications Nos. 89282/1987 and 276133/1986 disclose a track jump system based principally on the linear motor system.

However, restrictions on the installation position of the motor are the problem associated with this type of system. Use of the linear motor in the position in which gravitational acceleration is applied to the direction of movement of the motor entails unnecessary dissipation. Application of a balancing load is not a solution because it increases the load output, which is not economical. Thus, in order to overcome this problem, it is generally considered that a rotary motor is used to reduce the speed through gears. However, a greater reducing ratio decreases the pickup transfer speed, while a smaller reducing ratio does not allow smooth low-speed transfer.

The system with the rotary motor will be explained taking an example of a CD player.

A pickup head during data reading (playback) must move ca. 30 mm in about 60 min. Thus, reliable controllability in very low moving speeds including 30 mm/3600 sec≈0.008 mm/sec is required. On the other hand, in responding to the needs for a quicker music selection, for example, the pickup head is moved a distance of 30 mm in 0.2 sec. This demands controllability in a very high moving speed of 30 mm/0.2 sec≈150 mm/sec. The difference between the two speeds is as big as 1 to 18,000 in ratio.

The maximum speed of a motor in general is about 3,000 rpm. To cause the pickup head to travel a distance of 30 mm in 0.2 sec, a gear ratio that moves the pickup head 30 mm with ten revolutions (3000 rpm/60 sec×0.2 sec) must be selected. If, however, the gear ratio is left unchanged, the motor makes 10 revolutions in 60 min during data reading. This means that the motor speed is as low as 0.003 revolutions per sec (10 revolutions per hour/3600 sec) and that no ordinary motor can perform the control required.

Awkward transfer of the pickup head at low speeds not only impairs the quality of reading the information signals but, in some worst cases, leads to overshoots and track jumps in tracking operation as well. Thus, in order to maintain smooth low-speed tracking, a negative feedback is used to apply a signal proportional to the speed to the motor.

However, it is generally difficult to extract a signal proportional to the speed of motor in rotation. In order to obtain such a signal, a generator constituted by a magnet and a coil is used to take out a voltage by rectifying the voltage induced across the coil with a mechanical brush. However, the use of the mechanical brush imposes the problem of poor durability of the system.

Too high a speed of the motor limits the mechanical follow-up of the brush and thus requires that the contact pressure be increased. This aggravates, however, the problem of durability.

As described above, the conventional track jump control circuit had the problems not only of inaccurate track jump and speed control adjustment between high and low speeds but also of restricted pickup position and poor durability.

SUMMARY OF THE INVENTION

The present invention has been made in consideration of the above problems and has therefore as an object the provision of a track jump control circuit capable of performing high-speed and accurate track jump operation with features of good durability, position-free installation, and satisfactory low speed controllability.

Furthermore, a second object of the present invention is to provide a speed control motor, whose speed signal is electrically isolated from the drive signal of a rotary motor, thus allowing a sufficient speed feedback quantity to be obtained to stabilize the system performance.

A third object of the present invention is to provide a speed detector capable of detecting not only the direction of rotation but also very low speeds, and obtaining a signal proportional to the speed of rotation.

In order to achieve the above-described object, a first invention involves a track jump control circuit, which comprises: a head; a rotary motor which drives the head and whose drive force is controlled in accordance with an input signal; means for detecting a speed of rotation corresponding to the rotation of the rotary motor; means for detecting a distance the head should move with using no data read by the head when the head is moved to a desired position to produce a signal corresponding to the distance; means for setting a speed of movement of the head based on the signal produced by the distance detection means; and means for comparing a speed detected by the speed detection means with a speed set by the speed presetting means to produce an output as the input signal to the rotary motor.

The track jump control circuit according to the first invention allows a track jump speed to be suitably lowered, thereby preventing the head from overrunning, and thus accurate track Jump operations and high-speed transfer of the head can be attained. Its speed feedback contributes to smooth transfer of the head with small reducing ratios.

A second invention is a track jump control circuit that includes: a head; a rotary motor which drives the head and whose drive force is controlled in accordance with an input signal; means for detecting a speed of rotation corresponding to the rotation of the rotary motor that is electrically isolated from the rotary motor; means for detecting a distance which the head should move with using no data read by the head when the head is moved to a desired position to produce a signal corresponding to the distance; means for presetting a speed of movement of the head based on the signal produced by the distance detection means; and means for comparing a speed detected by the speed detection means with a speed set by the speed setting means to produce an output as the input signal to the rotary motor.

The track jump control circuit according to the second invention has a feature that the rotary motor drive signal is electrically isolated from the motor speed signal. This eliminates the leakage of the drive signal into the detected speed signal, thereby allowing an adequate speed feedback quantity to be obtained to stabilize the system performance.

A third invention is a speed control motor that consists of: a motor whose drive force is controlled in accordance with an input signal; means for detecting a speed of the motor, the means being electrically isolated from the motor; and means for comparing the detected speed signal with a reference signal to produce an error signal as the input signal to the motor.

The speed control motor according to the third invention has its drive signal electrically isolated from its speed signal, and therefore, here again, the motor drive signal is not leaked into the detected speed signal. This ensures that an adequate speed feedback quantity is obtained, thereby achieving stable system performance.

A fourth invention is a speed detector, which comprises: a rotary body; a plurality of means for detecting speed signals proportional to the speed of rotation of the rotary body; a plurality of means provided corresponding to each of the plurality of detection means for detecting positions of the rotary body; a plurality of absolute amplifiers provided corresponding to each of the plurality of detection means for rectifying signals proportional to the speeds produced by the detection means according to an output signal of signal detection means corresponding to the detection means; and means for adding output signals of the plurality of absolute amplifiers to generate a speed signal.

A fifth invention is a speed detector, which includes: a rotatable magnet; a plurality of fixed coils, each of which generates an emf as the magnet rotates; means for detecting a rotational position of the magnet to produce a position signal; a plurality of means provided correspondingly to each of the coils for inverting the emf generated by each of the plurality of coils; a plurality of noninverting means provided correspondingly to each of the coils for producing the emf without inverting it; a plurality of means provided correspondingly to each of the plurality of differentiating means for producing an output by switching the output signals of the inverting means and the noninverting means in accordance with the position signal; and means for adding the outputs of the plurality of switching means.

A sixth invention is a speed detector, which comprises: a rotatable magnet; a plurality of means for detecting rotational positions of the magnet to produce position signals; a plurality of means for differentiating the position signals produced by the plurality of position detection means; means provided correspondingly to each of the plurality of differentiating means for inverting an output signal of each of the plurality of differentiating means; noninverting means provided correspondingly to each of the plurality of differentiating means for producing an output signal of each of the plurality of differentiating means without inverting it; a plurality of means provided correspondingly to each of the plurality of differentiating means for producing an output by switching the output signals of the inverting means and the noninverting means in accordance with the position signal; and means for adding the outputs of the plurality of switching means.

The fourth, fifth, and sixth inventions may allow detection of not only the direction of rotation and low speeds but also generation of a signal proportional to the speed of rotation.

BRIEF DESCRIPTION OF THE DRAWINGS

FIGS. 10 to 13 are charts showing waveforms of signals at respective points of the track jump control circuit of FIG. 3;

FIG. 14 is a diagram showing the relationship between the count value of the counter and the moving speed of the head;

FIGS. 15 and 16 are diagrams showing test data of both count pulse signal and detected speed signal;

FIG. 17 is a chart showing waveforms of signals at respective points of the comparator unit 17;

FIG. 26 is a chart showing waveforms of signals at respective points when the magnetic yoke 1 is rotated in one direction;

FIG. 27 is a chart showing waveforms of signals at various points when the magnetic yoke 1 is rotated in another direction;

FIGS. 28 to 31 are charts showing waveforms of output signals at respective points when the magnet 49 is rotated both clockwise and counterclockwise;

FIGS. 32 to 37 are charts showing waveforms of signals at respective points when the magnet 49 is rotated both clockwise and counterclockwise in the speed detection unit of the second embodiment.

DESCRIPTION OF THE PREFERRED EMBODIMENTS

Embodiments of this invention will hereunder be described in detail with reference to the accompanying drawings.

Figure 1:
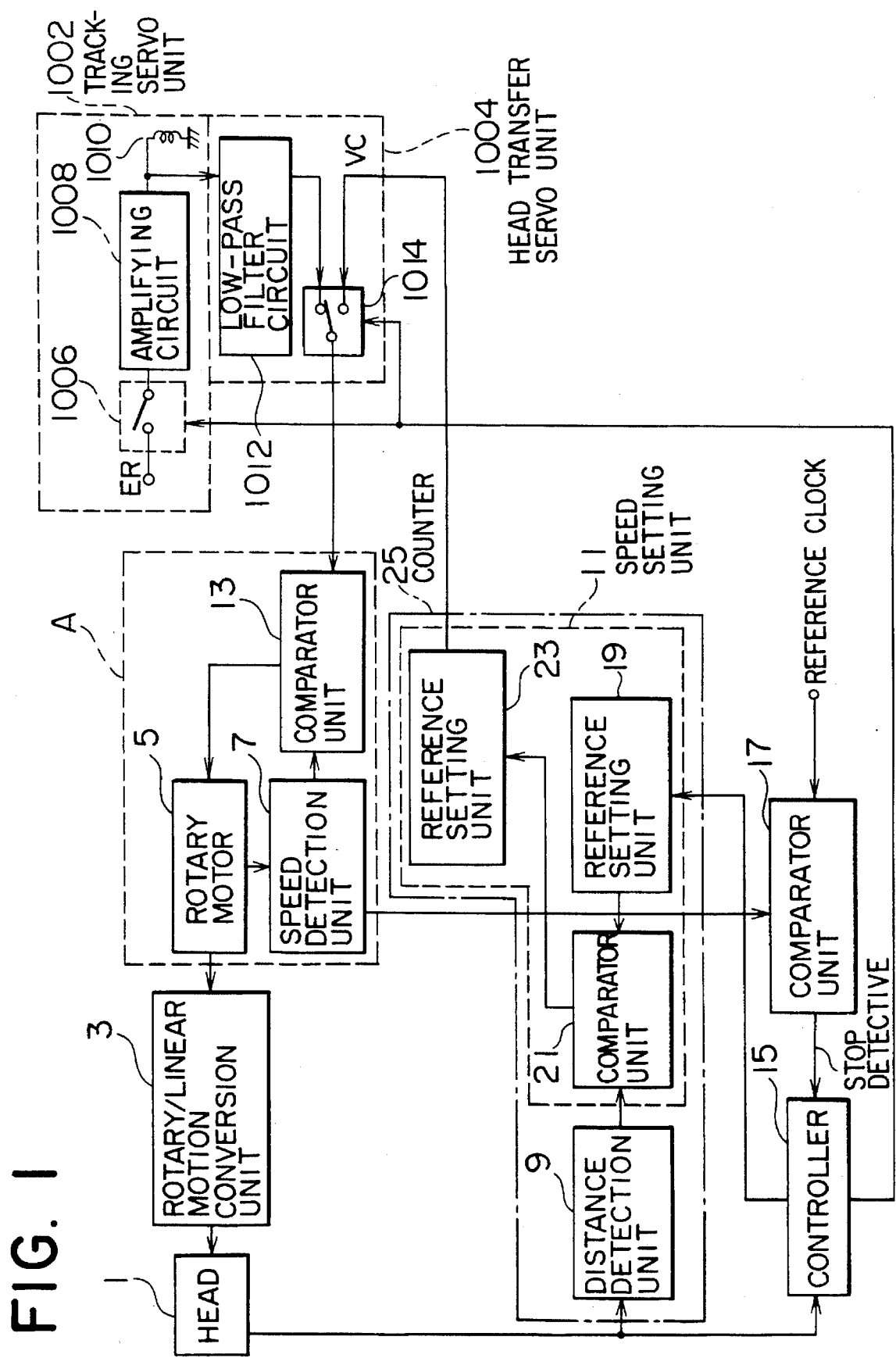
FIG. 1 is a block diagram showing the configuration of a track jump control circuit of a first embodiment of this invention.

FIG. 1 is a block diagram showing the configuration of a track jump control circuit according to a first embodiment of this invention.

The track jump control circuit comprises: a head 1, a rotary/linear motion conversion unit 3, a rotary motor 5, a speed detection unit 7, a distance detection unit 9, a speed setting unit 11, a comparator unit 13, a controller 15, a comparator unit 17, a tracking servo unit 1002, and a head transfer servo unit 1004. The speed setting unit 11 includes a reference setting unit 19, a comparator unit 21, a reference setting unit 23. The tracking servo unit 1002 comprises a switch 1006, an amplifying circuit 1008, a tracking actuator 1010. The head transfer servo unit 1004 includes a low-pass filter circuit 1012 and a switch 1014.

The rotary motor 5, the speed detection unit 7, and the comparator unit 13 constitute a speed control motor A.

The rotary/linear motion conversion unit 3 converts a rotary motion of the rotary motor 5 to a linear motion to transfer the head 1.

The speed detection unit 7 detects the speed of rotation of the rotary motor 5 and applies this detected speed to the comparator units 13 and 17.

The comparator unit 13 compares a reference speed signal VC set by the speed setting unit 11 and received through the switch 1014 with a speed detected by the speed detection unit 7 and applies an error or the difference to the rotary motor 5 to thereby rotate the motor 5 at the reference speed.

The distance detection unit 9 detects a signal that corresponds to the distance the head 1 should move. The speed setting unit 11 compares this distance detected by the distance detection unit 9 with a reference of the reference setting unit 19 set by the controller 15, and sets a speed of movement of the head 1 based on their difference.

As described above, the speed setting unit 11 comprises the reference setting unit 19, the comparator unit 21, and the reference setting unit 23; the reference setting unit 19 produces a reference set by the controller 15.

The comparator unit 21 compares the output signal of the distance detection unit 9 with that of the reference setting unit 19 and calculates the speed that changes according to the distance the head 1 should move and supplies it to the reference setting unit 23.

The reference setting unit 23 produces an output according to a reference speed signal fed from the comparator unit 21.

The controller 15 controls the respective units.

The tracking servo unit 1002 sends a tracking error signal ER to the head transfer servo unit 1004.

That is, in the so-called position control, the controller 15 closes the switch 1006 and the switch 1014 is set to the low-pass filter circuit 1012 position. Hence, the tracking error signal ER passing through the amplifying circuit 1008 and low-pass filter circuit 1012 is received by the comparator unit 13, and the head 1 is subjected to position control.

On the other hand, in speed control (at the time of track jump), the switch 1014 is set to the reference setting unit 23 position, whereby the reference speed signal VC set by the speed setting unit 11 is supplied to the comparator unit 13 and the head 1 is subjected to speed control.

The comparator unit 17 detects a head stop signal out of both the rotary pulse signal applied from the speed detection unit 7 and the reference clock and sends this stop signal to the controller 15.

Figure 2:
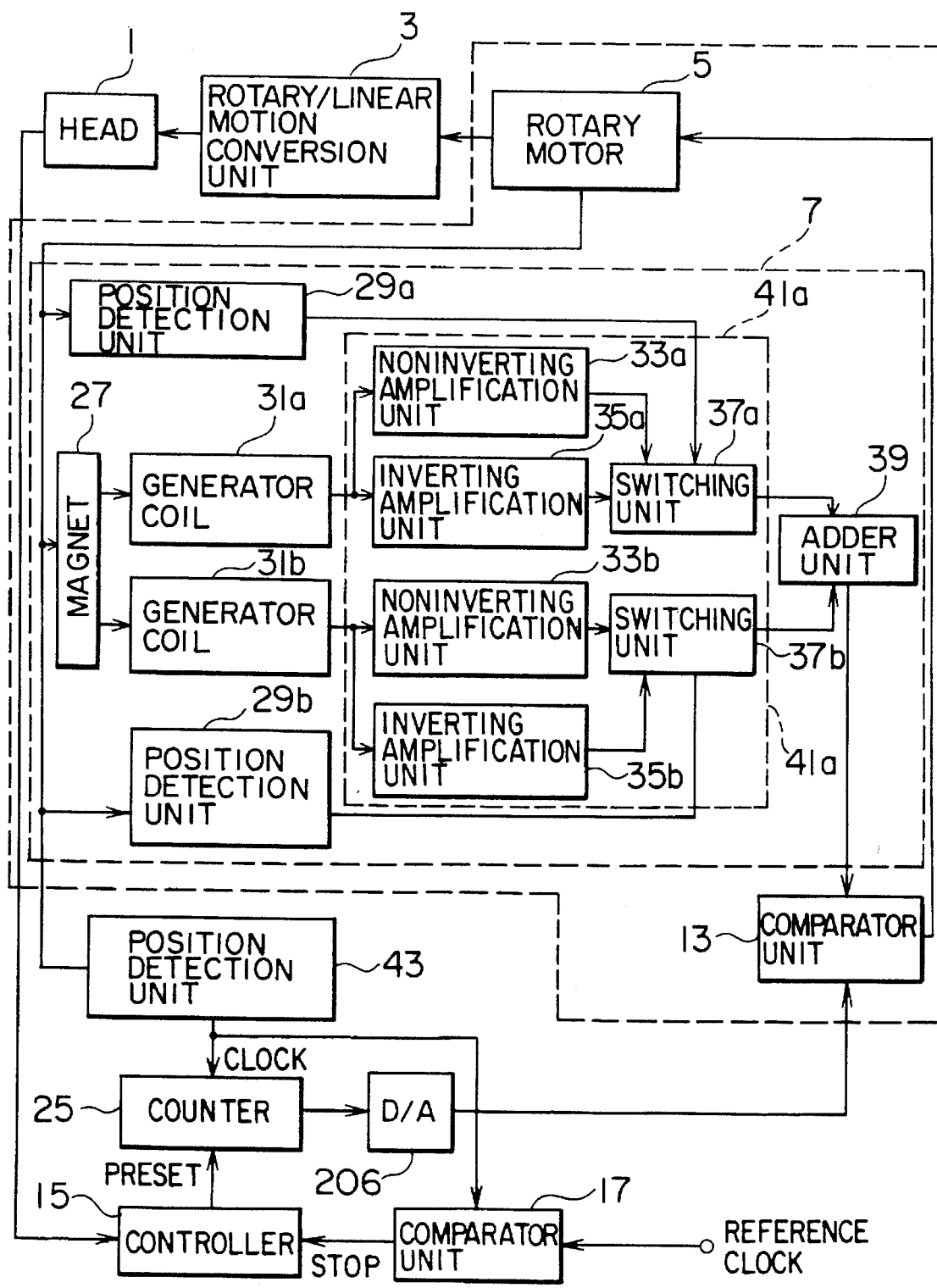
FIG. 2 is a block diagram of a track jump control circuit in which the speed detection unit 7 of FIG. 1 is more specifically shown and a counter 25 substitutes for both the distance detection unit 9 and speed setting unit 11.

FIG. 2 shows another version of a track jump control circuit, in which tracking servo unit 1002 and head transfer servo unit 1004 are omitted and the configuration of the speed detection unit 7 of FIG. 1 is more specified. In this version, a counter 25 substitutes for distance detection unit 9 and speed setting unit 11. An input to the distance detection unit 9 is applied from a position detector mounted on the rotary motor 5 and the stop detection signal is derived from the speed signal.

In the following descriptions, both tracking servo unit 1002 and head transfer servo unit 1004 in FIG. 1 will be omitted and the output of reference setting unit 23 will be directly applied to the comparator unit 13.

As shown in this figure, the speed detection unit 7 comprises a magnet 27, position detection units 29a and 29b, generator coils 31a and 31b, a noninverting amplification units 33a and 33b, inverting amplification units 35a and 35b, switching units 37a and 37b, and an adder unit 39.

The magnet 27 is rotated as the rotary motor 5 rotates.

Figure 3:
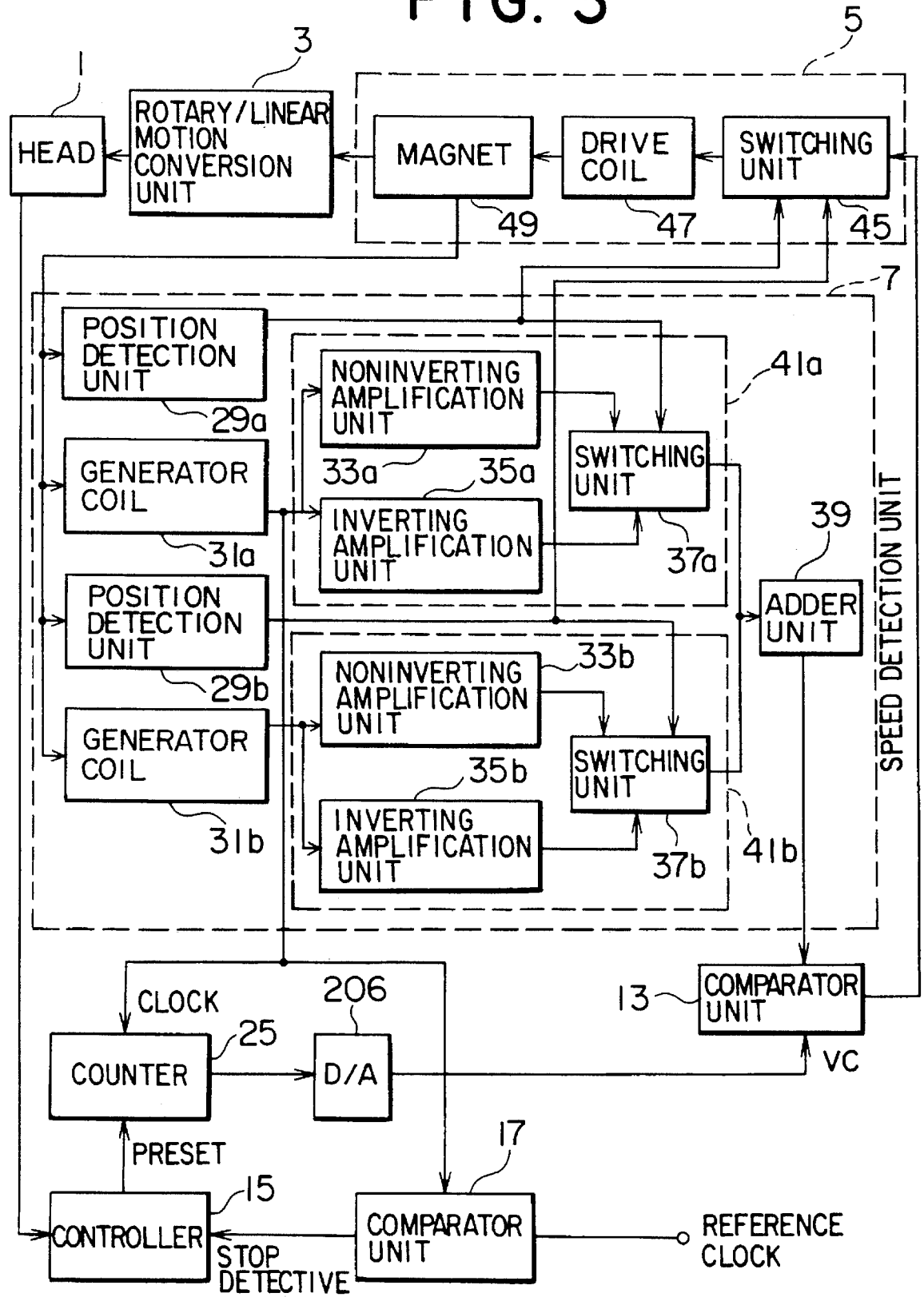
FIG. 3 is a block diagram showing a track jump control circuit in which the magnet 27 is shared with the rotary motor 5 in FIG. 2.

FIG. 3 is the track jump control circuit of FIG. 2 with such modifications that the magnet 27, a component of the speed detection unit 7, is shared with the rotary brushless motor 5; the clock of the counter is shared with the position signal of the motor; and the input signal of a switching unit 45 is shared with the position detection units 29a, 29b.

As shown in this figure, the rotary motor 5 constitutes a brushless motor consisting of switching unit 45, a drive coil 47, and a magnet 49.

The track jump control circuit shown in FIG. 3 will hereunder be described.

Figure 4:
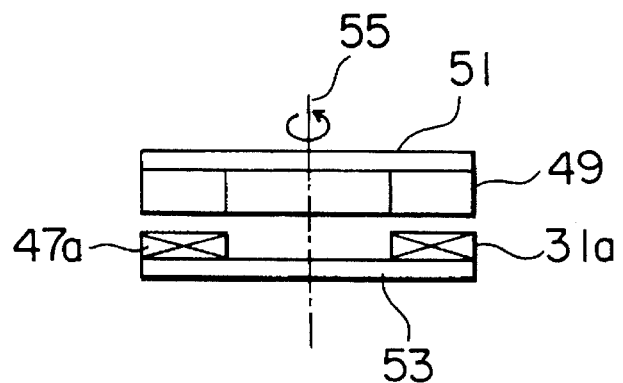
FIG. 4 is an elevation of the magnet 49.
Figure 5:
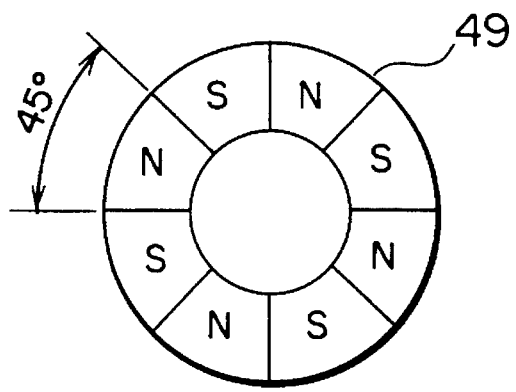
FIG. 5 is a plan view of the magnet 49.
Figure 6:
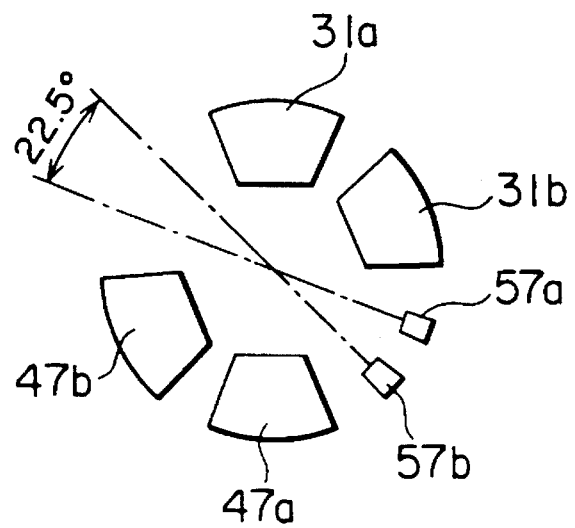
FIG. 6 is a plan view of the drive coil, generator coil, and position detector (Hall element) provided on the magnetic yoke.

FIG. 4 is an elevation of the magnet 49 and its vicinity; FIG. 5 is a plan view of the magnet 49; and FIG. 6 is a plan view of drive coils 47a, 47b and generator coils 31a, 31b.

The 8-pole magnet 49 as shown in FIG. 5 is secured to a disc-shaped magnetic yoke 51. As shown in FIG. 6, pairs of drive coils 47a, 47b, generator coils 31a, 31b, and the Hall elements 57a, 57b that are principal components of position detection units 29a, 29b are secured to a magnetic yoke 53. The magnetic yoke 53 is fixed, while the magnetic yoke 51 is rotatable in either direction around a shaft 55.

Figure 7:
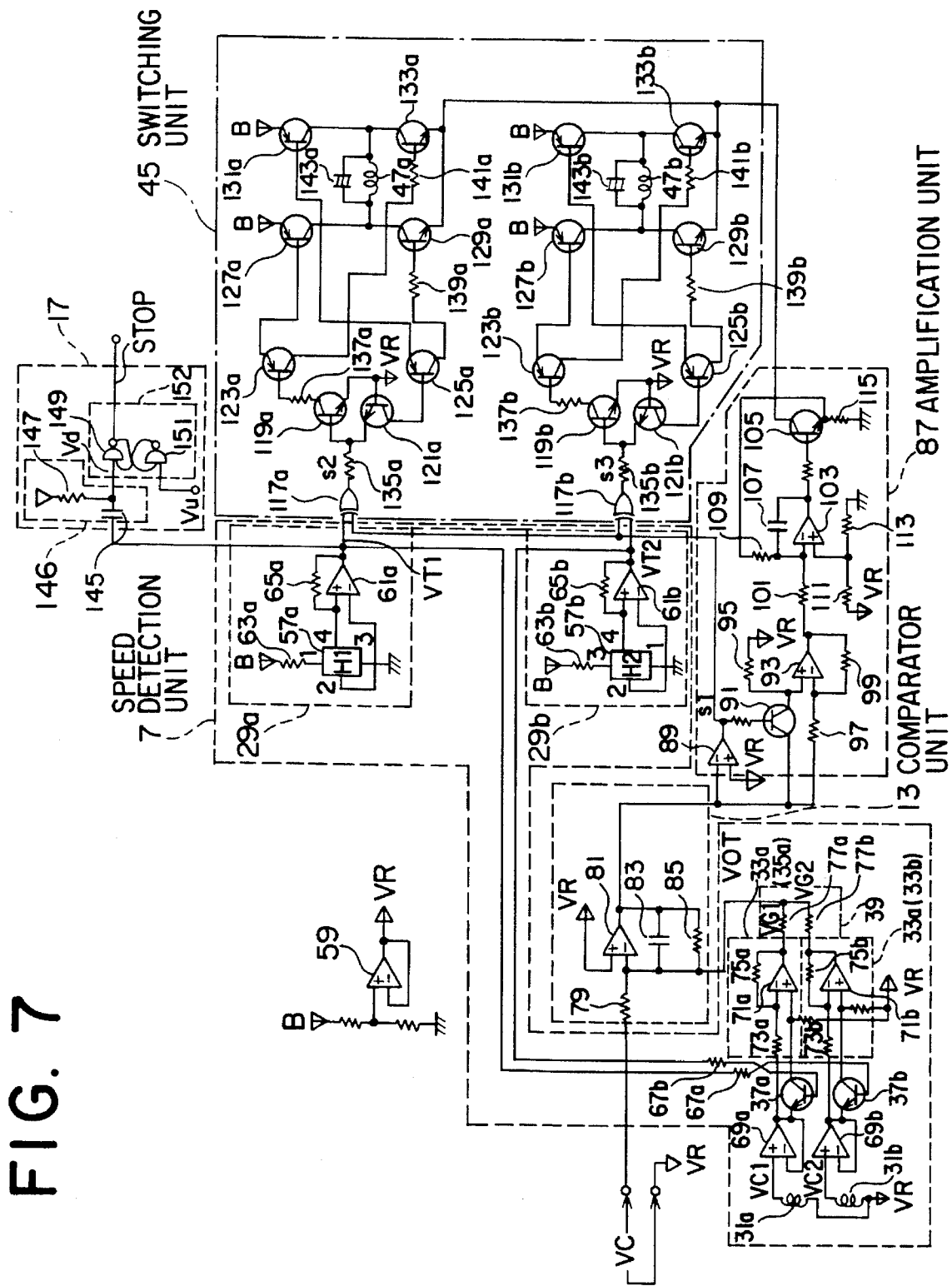
FIG. 7 is a circuit diagram showing the configuration of the track jump control circuit of FIG. 3.
Figure 8:
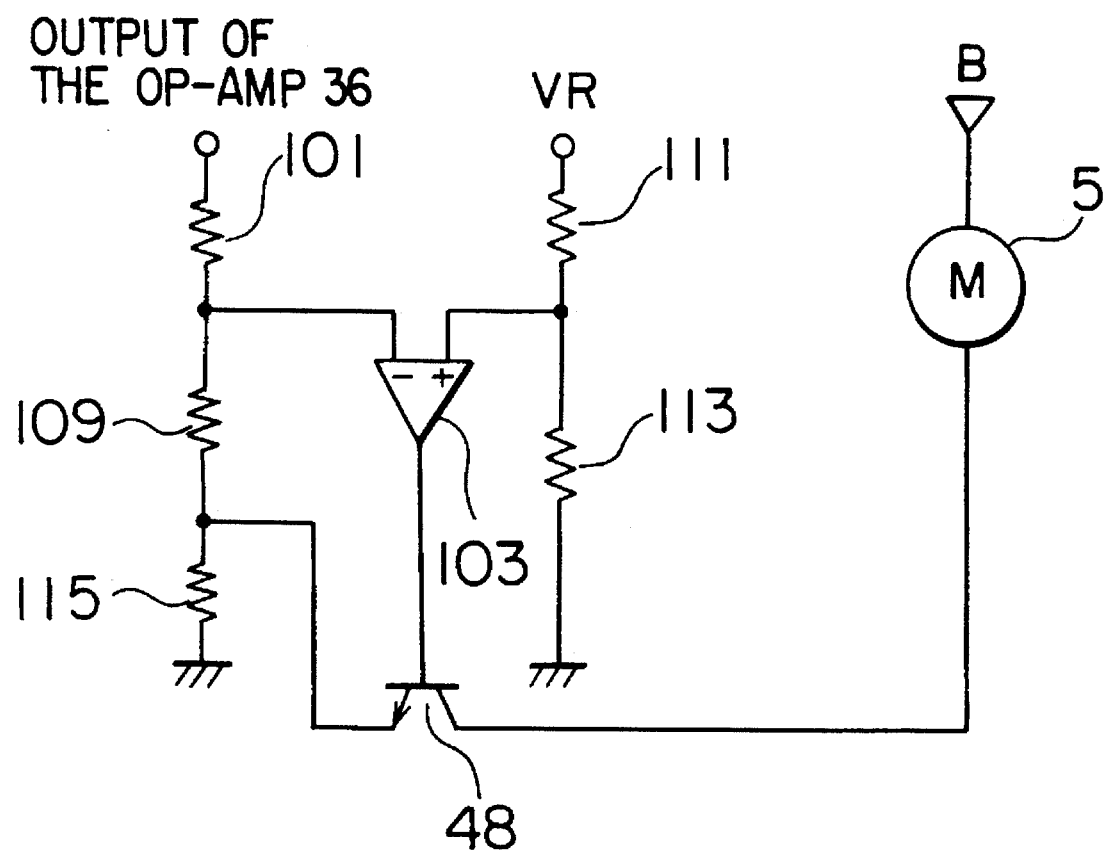
FIG. 8 is an equivalent circuit diagram of the operational amplifier (op-amp) 103 and its vicinity.

FIG. 7 shows this particular track jump control circuit.

In this figure, reference letter B denotes a power supply voltage, which is applied to respective units as a reference voltage VR through an op-amp 59.

The position detection unit 29a is formed of the Hall element 57a, an op-amp 61a, and resistors 63a, 65a. The position detection unit 29b has a similar configuration. The Hall elements 57a, 57b supply the output signals as shown in FIGS. 10(a) and (b) to the op-amps 61a, 61b in accordance with the rotation of the magnet 49.

The output signal of the Hall element 57a has its waveform shaped by the op-amp 61a and resistor 65a, converted to a digital signal of "1" or "0", and fed to the base of the transistor 37b (FIG. 10(c)).

Similarly, the output signal of the Hall element 57b is converted to a digital value and supplied to the base of the transistor 37a (FIG. 10(d)).

The generator coils 31a, 31b are connected to the op-amps 69a, 69b for impedance conversion. These coils 31a, 31b each generate an electromotive force (emf) through their interaction with the magnet 49 as the magnetic yoke 51 rotates (FIGS. 10(e) and (f)).

The outputs of the op-amp 69a and transistor 37a are applied to an op-amp 71a that functions as a noninverting amplification unit 33a or an inverting amplification unit 35a.

The inverting amplification unit 35a or noninverting amplification unit 33a consists of the op-amp 71a and resistors 73a, 75a. Similarly, the noninverting amplification unit 35b or inverting amplification unit 33b consists of the op-amp 71b and resistors 73b, 75b.

The output signal of the op-amps 71a, 71b is applied to an op-amp 81 through resistors 77a, 77b.

The op-amps 69a, 69b respectively convert the impedance of a voltage signal applied from the generator coils 31a, 31b to a lower value.

The transistors 37a, 37b are turned on with a signal "1" applied to their base and turned off with a signal "0".

The op-amp 71a acts as a noninverting amplifier with a gain "1" when the transistor 37a is on and as an inverting amplifier with a gain "−1" when the transistor 37a is off. That is, the resistors 73a, 75a have an equal resistance. This amplifying operation serves as the switching unit 37a.

The op-amp 71b similarly functions, and the resistors 73b, 75b have an equal resistance.

The output signals of the op-amps 71a, 71b are added at the adder unit 39 and sent to the op-amp 81 as a detected speed signal VOT.

The adder unit 39 consists of resistors 77a, 77b.

The comparator unit 13 comprises the op-amp 81, a resistor 79, a capacitor 83, and a resistor 85. It is supposed that the resistor 79 has the same resistance as the resistors 77a, 77b.

The op-amp 81 compares the control signal VC with the detected speed signal VOT; in other words, it adds (subtracts) them in consideration of their polarity. If the signal added (subtracted) is smaller than the reference voltage VR, the op-amp 81 produces a positive output; otherwise it generates a negative output. The speed signal VOT is delivered from the op-amps 71a, 71b.

An amplification unit 87 includes: an op-amp 89, a transistor 91, an op-amp 93, resistors 95, 97, 99, 101, an op-amp 103, a transistor 105, a capacitor 107, and resistors 109, 111, 113, 114.

The op-amp 89, which is a comparator for comparing the output signal of the op-amp 81 with the reference voltage VR, detects the direction of rotation of the motor (direction of torque) based on the polarity of its own output. That is, the output of the op-amp 81 is greater than the reference voltage VR, the op-amp 89 produces an output that is negative with respect to the reference voltage, or at ground (GND) level. If the output of the op-amp 81 is smaller than the reference voltage VR, the op-amp 89 generates an output that is positive with respect to the ground level (GND), thereby being substantially equal to the power supply voltage B.

The means of converting a torque control signal to an absolute value in the amplification unit 87 consists of the transistor 91, the op-amp 93, and the resistors 95, 97, 99. The resistors 97 and 99 are set to have an equal resistance.

The transistor 91 is turned on with the output of the op-amp 89 being positive, while it is turned off with the output being negative.

The op-amp 93 serves as a noninverting amplifier with a gain "1" when the transistor 91 is on and as an inverting amplifier with a gain "−1" when the transistor is off. Thus, the op-amp 93 produces an output whose value is always smaller than the reference voltage VR independently of the output of the op-amp 81; i.e. it produces the "absolute value".

The op-amp 103 and the resistors 101, 109, 111, 113 constitute a bridge circuit as shown in FIG. 6. The resistors 101, 109, 111, 113 have an equal resistance. The resistance of the resistor 115 is sufficiently smaller than that of the resistor 109.

When the op-amp 93 produces an output that is equal to the reference voltage VR, no current flows through the resistor 115, whereas when the op-amp 93 generates an output that is negative with respect to the reference voltage VR, the op-amp 103 produces a positive output until a current corresponding to that voltage flows through the resistor 115 and thus the transistor 105 is turned on. With the transistor 105 biased on, the current flows across the transistor 105 through the transistor 129a or 133a, or the transistor 129b or 133b.

With respect to the motor drive coils 47a, 47b, the switching unit 45 have: exclusive OR gates 117a, 117b; transistors 119a, 119b, 121a, 121b, 123a, 123b, 125a, 125b, 127a, 127b, 129a, 129b, 131a, 131b, 133a, 133b; resistors 135a, 135b, 137a, 137b, 139a, 139b, 141a, 141b; and capacitors 143a, 143b.

The comparator unit 17 consists of both a differentiating circuit 146 including a capacitor 145 and a resistor 147; and an RS flip-flop 152 including NAND gates 149, 151.

The differentiating circuit 146 differentiates a signal VT1. The RS flip-flop 152 is set by the output signal Vd of the differentiating circuit 146 and reset by the signal Vμ sent from the controller 15.

Figure 9:
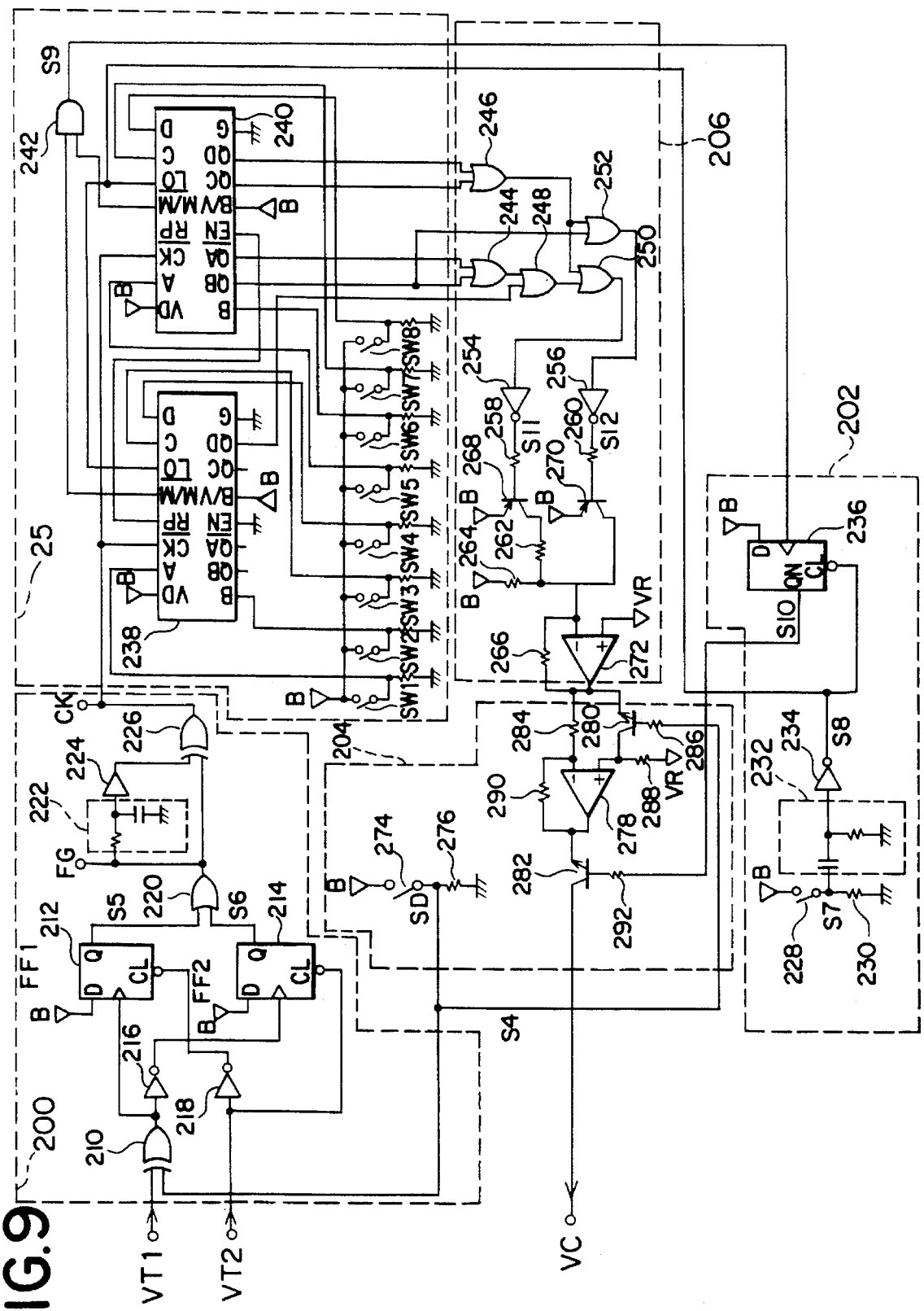
FIG. 9 is a circuit diagram showing the configuration of the speed setting means.

FIG. 9 is a circuit diagram showing the configuration of the counter 25 and its peripheral circuits, which include the counter 25, a doubler circuit 200, a start-stop circuit 202, a direction switching circuit 204, and a D/A conversion circuit 206.

The doubler circuit 200 consists of an exclusive OR gate 210, inverters 216, 218, D-type flip-flops 212, 214, an OR gate 220, an integrating circuit 222, a buffer 224, and an exclusive OR gate 226.

The output signal of the op-amp 61a of the position detection unit 29a is applied to one end of the exclusive OR gate 210; i.e., the exclusive OR gate 210 receives the signal VT1 that indicates the rotational position of the magnet 49. The inverter 218 receives the output signal VT2 of the op-amp 61b.

The exclusive OR gate 210, inverters 216, 218, D-type flip-flops 212, 214, and OR gate 220 generate a count pulse signal FG at the time of track jump out of the supplied signals VT1, VT2.

The integrating circuit 222, buffer 224, and exclusive OR gate 226 generate a clock signal CK from the count pulse signal FC and applies it to the counter 25 for edge detection. The start-stop circuit 202 comprises a switch 228, a resistor 230, a differentiating circuit 232, an inverter 234, and a D-type flip-flop 236.

The switch 228 is a start switch. The differentiating circuit 232 applies, upon turning on of the switch 228, a trigger to the D-type flip-flop 236 and the counter 25 through the inverter 234.

The counter 25 has 4-bit downcounters 238, 240, an AND gate 242, and switches SW1, SW2, SW3, SW4, SW5, SW6, SW7, SW8. Both downcounters 238, 240 constitute an 8-bit binary downcounter. Each switch SW1, . . . , SW8 sets a preset value to the downcounters 238, 240, and the setting operation is performed by a controller 15 (not shown). The switch SW8 sets a value that is the most significant bit (MSB) and the switch SW1 a value that is the least significant bit (LSB).

The downcounters 238, 240 have their preset input terminals connected to each of the preset switches SW1, . . . , SW8.

The contents of the 8-bit downcounter are, as shown in FIG. 9, is received by OR gates 244, 246, 248 of the D/A conversion circuit 206.

Further, the output signal of the max-minimum terminal (M/M) of each of the downcounters 238, 240 is given as a clock signal to the D-type flip-flop 236 through the AND gate 242. This max-minimum terminal is set to "1" when the output signals of both downcounters 238, 240 are "0".

The D/A conversion circuit 206 comprises the OR gates 244, 246, 248, 250, 252; inverters 254, 256; resistors 258, 260, 262, 264, 266; transistors 268, 270; and an op-amp 272.

The transistor 268 is turned off with the inverter 254 applying an output "1", while the transistor 270 is turned off with the inverter 256 applying an output "1". The op-amp 272 converts a received current to a corresponding voltage.

The direction switching circuit 204 has a switch 274, a resistor 276, an op-amp 278, transistors 280, 282, and resistors 284, 286, 288, 290, 292.

The switch 274 is opened and closed by the controller 15 to change a track jump direction. The transistor 280 is turned on with the switch 274 closed. Assuming that the resistor 284 has a value equal to that of the resistor 190, the op-amp 278 functions as an inverting amplifier with a gain "−1" when the transistor 280 is off and as a noninverting amplifier with a gain "1" when the transistor 280 is on.

There now follows a description of an operation of this embodiment.

Figure 11K:
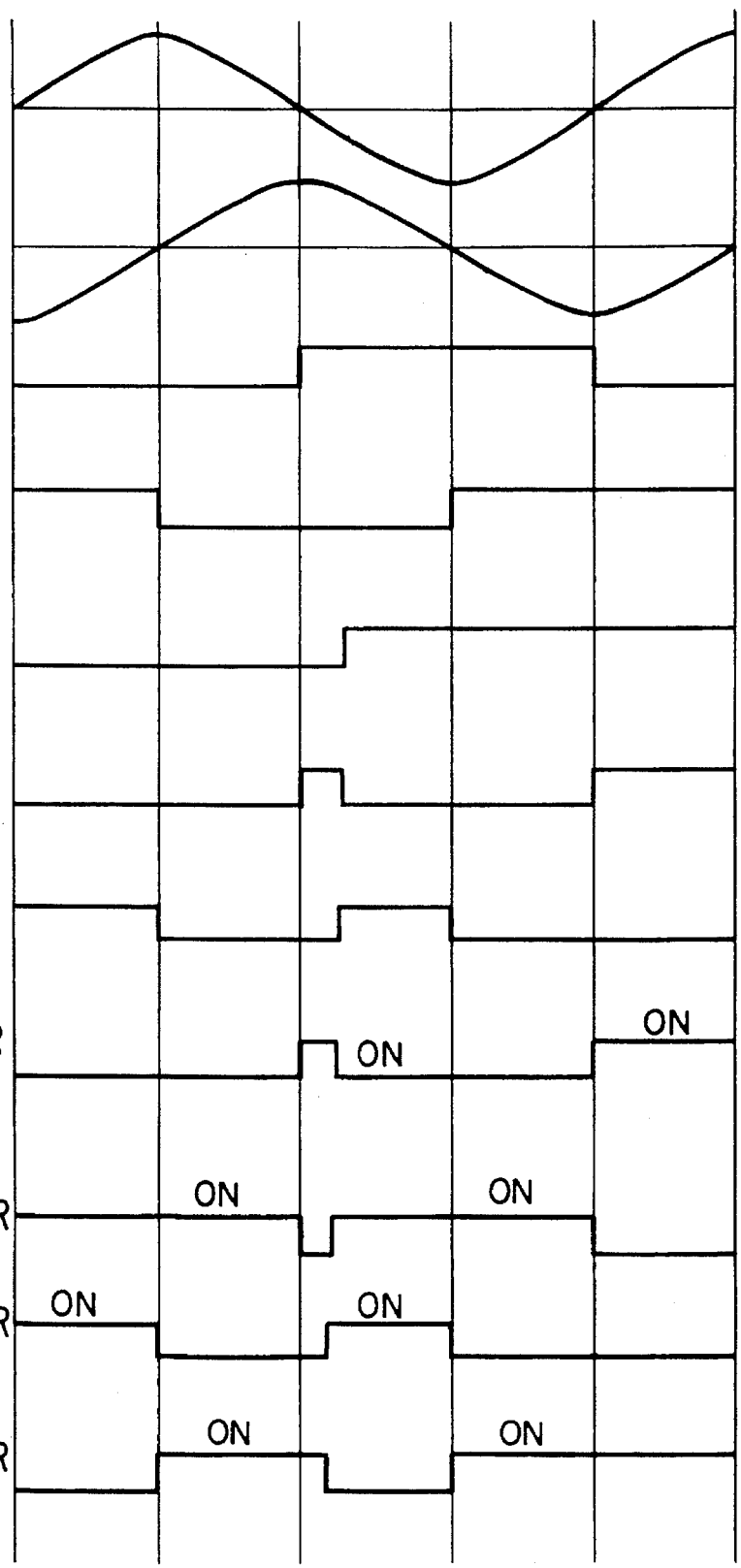

FIGS. 10 and 11 are charts showing waveforms of signals at respective units when the magnetic yoke 51 is rotated in only one direction. FIGS. 10(a) and (b) respectively show outputs H1, H2 of the Hall elements 57a, 57b. As shown in these figures, they exhibit the sine waves that are 90° out of phase.

FIGS. 10(c) and (d) respectively show waveforms of the output signals VT1, VT2 of the op-amps 61a, 61b.

FIGS. 10(e) and (f) show waveforms of the voltage signals VC1, VC2 generated at the generator coils 31a, 31b, respectively. Each of the signals VC1, VC2 also depict a sinusoidal waveform.

As the magnet 49 rotates around the shaft 55, the generator coils 31a, 31b are caused to generate emfs through their interaction with the magnet, and the generator coils 31a, 31b transmit the signals VC1, VC2 to the op-amp 69a, 69b (FIGS. 10(e) and (f)).

The Hall elements 57a, 57b detect the position of the magnet 49 and produce output signals H1, H2.

The output signal H1 of the Hall element 57a has its waveform shaped by the op-amp 61a and is delivered as an output signal VT1 (FIG. 10(c)), whereas the output signal H2 of the Hall element 57b has its waveform shaped by the op-amp 61b and is delivered as an output signal VT2 (FIG. 10(d)).

The output signal VT1 of the op-amp 61a biases the transistor 37b. This causes the transistor 37b to turn on if the applied signal VT1 is "1", allowing the op-amp 71b to function as a noninverting amplifier with a gain "1". Thus, in the meantime, the op-amp 71b produces an output signal VG2 that has the same polarity as that of the signal VC2.

The transistor 37b is biased off with the signal VT1 being "0" and the op-amp 71b functions as an inverting amplifier with a gain "−1". Thus, in the meantime, the op-amp 71b produces an output signal VG2 that has the polarity opposite to that of the signal VC2 (FIG. 10(h)).

The output signal VT2 of the op-amp 61b biases the transistor 37a. This causes the transistor 37a to turn on if the signal VT2 is "1", allowing the op-amp 71a to function as a noninverting amplifier with a gain "1". Thus, in the meantime, the op-amp 71a produces an output signal VG1 that has the same polarity as that of the signal VC2.

The transistor 37a is biased off with the signal VT2 being "0" and the op-amp 71a functions as an inverting amplifier with a gain "−1". Thus, in the meantime, the op-amp 71a produces an output signal VG1 that has the polarity opposite to that of the signal VC1 (FIG. 10(g)).

The output signals VG1, VG2 of the op-amps 71a, 71b are synthesized to form a detected speed signal VOT, which is then applied to the op-amp 81. As shown in FIG. 10(i), this detected speed signal has a waveform that is substantially flat. The polarity of signal VOT is negative.

On the other hand, when the magnetic yoke 51 is rotated in the direction opposite to the previously set direction, the polarity of detected speed signal VOT is changed to positive. As the rotation of the magnetic yoke 51 is increased, an output signal VOT corresponding to that increased rotation can be obtained.

As is clear from the above, the detected speed signal VOT is a signal incorporating the component of direction of rotation of the magnet 49.

An addition signal of the outputs of both op-amps 71a, 71b is received by the op-amp 81 as a detected speed signal VOT, and the output signal of the op-amp 81 is applied to the op-amp 89.

An output signal S1 (FIG. 11(e)) of the op-amp 89 is a signal indicating the direction of torque of the motor.

The exclusive OR gate 117a produces an output that is an exclusive OR of the output signal S1 of the op-amp 89 and output signal VT1 of the op-amp 61a, or such output signal S2 as shown in FIG. 11(f). Similarly, an output signal S3 such as shown in FIG. 11(g) is generated from the exclusive OR gate 117b.

When the output signal S2 of the exclusive OR gate 117a becomes "1", the transistors 119a, 123a, 127a, 133a are turned on, while the transistors 121a, 125a, 129a, 131a are turned off (FIGS. 11(h) and (i)), which then causes a current to flow not only through the transistor 127a, drive coil 47a, transistor 133a but also to the resistor 115 through the transistor 105. The switching of the drive coil 47a is performed in this way.

When the output signal S2 of the exclusive OR gate 117a becomes "0", the transistors 119a, 123a, 127a, 133a are turned off, while the transistors 121a, 125a, 129a, 131a are turned on (FIGS. 11(h) and (i)), which then causes a current to flow not only through the transistor 131a, drive coil 47a, transistor 129a but also to the resistor 115 through the transistor 105.

Similarly, the drive coil 47b is energized according to the output signal of the exclusive OR gate 117b for its switching operation (FIGS. 11(j) and (k)).

Figure 12:
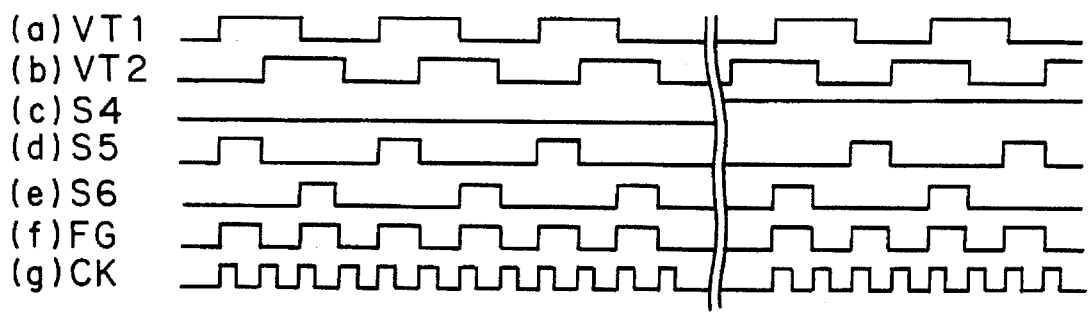
Figure 13:
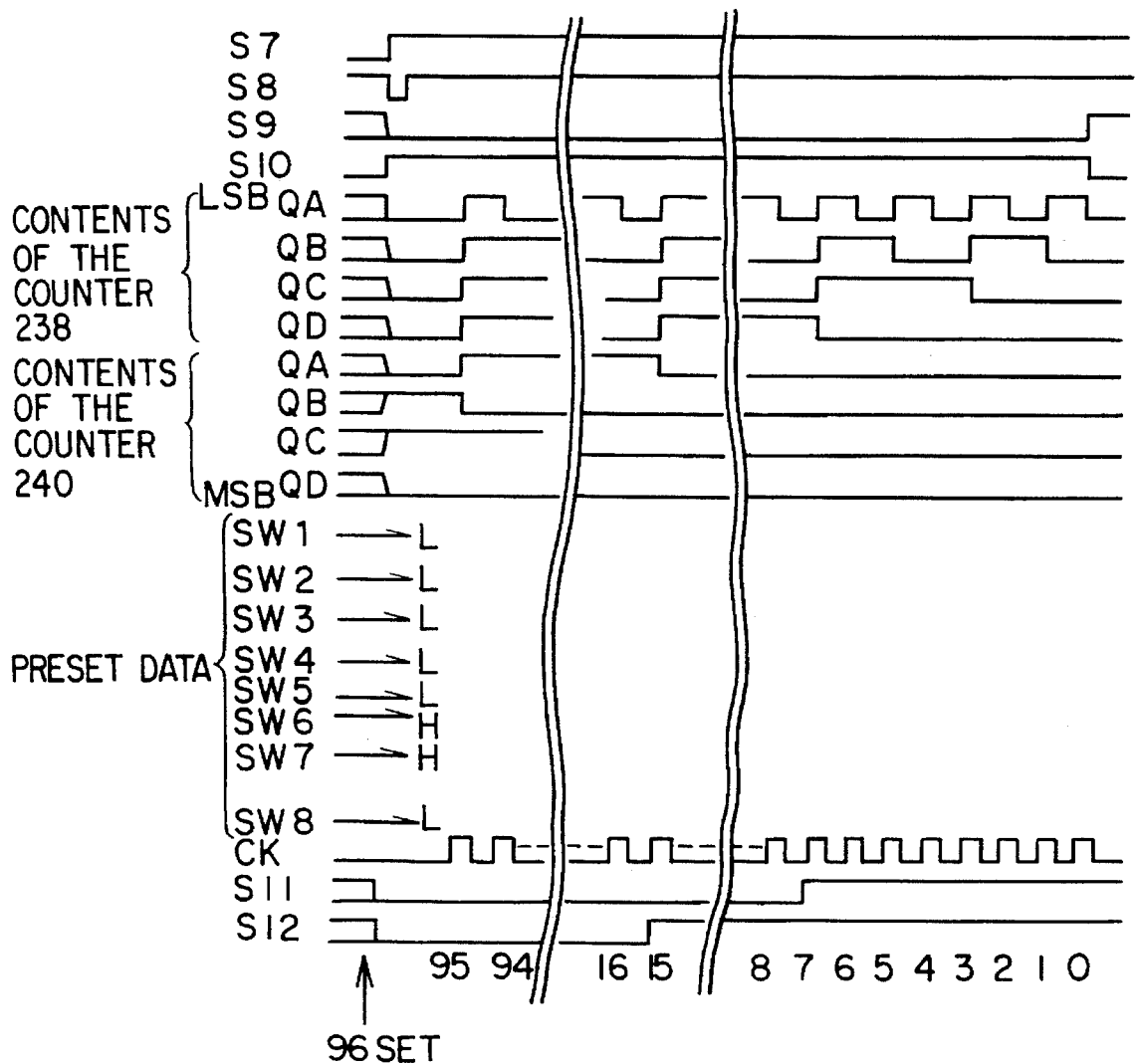

FIGS. 12 and 13 are charts showing waveforms of signals at respective units of FIG. 9. The signals VT1 and VT2 are 90° out of phase.

The flip-flops 212, 214 produce pulse signals such shown in FIGS. 12(d) and (e), which are synthesized to form a count pulse FG through the OR gate 220 (FIG. (f)). The count pulse FG is further processed through the integrating circuit 222 and exclusive OR gate 226 to generate a clock signal CK (FIG. 12(g)).

Let us now consider the case in which a value "96" is preset to the downcounters 238, 240.

In this case, the switches SW6 and SW7 are turned on; other switches are off; and a binary number "96" is set to the downcounters 238, 240.

When the start switch 228 is turned on, a signal S7 is fed to the differentiating circuit 232 that then detects a change in the signal S7 and the inverter 234 produces a signal S8 such as shown in FIG. 13.

The signal S8 causes data "96" to be preset in the downcounters 238, 240.

Thus, the 8-bit downcounter contains "96", which is then converted to a predetermined value at the D/A converter 206 and delivered. This means, when applied to the block diagram in FIG. 1, that the value "96" is set to the reference setting unit 19, and the output of the comparator unit 21 coincides with the contents of the 8-bit downcounter.

The flip-flop 236 is reset to cause QN to be "1" and the transistor 282 to turn on. This starts rotating the motor in a predetermined direction.

Upon application of a clock signal CK from the controller to the downcounters 238, 240, this controller starts counting down and signals such as shown in FIG. 13 are generated at the output terminals QA, QB, QC, QD of each of the downcounters 238, 240.

When "96" is counted down to "15" and the output signal S12 of the inverter 256 becomes "1", the transistor 270 is turned off.

When the down-counted value is "7", the output signal S11 of the inverter 254 becomes "1", and the transistor 268 is turned off.

When the down-counted value reaches "0", the max-minimum terminal is set to "1". At this point, the AND gate 242 produces an output "1"; the D-type flip-flop 236 is inverted to turn off the transistor 282; the control signal VC is set to "0" (the same voltage as VR); and the rotary motor 5 is stopped.

If the transistors 268, 270 are on, a control signal VC that is large is applied; if the transistor 270 is off and the transistor 268 is on, a control signal VC that is medium is obtained; and if both transistors 268, 270 are off, a control signal VC that is small is obtained.

To change the track jump direction, the switch 274 is used. When this switch is closed, the transistor 280 is turned on, while when the switch is opened, the same transistor is turned off.

If an equal resistance is given to the resistors 290 and 284, the op-amp 278 functions as an inverting amplifier with a gain "−1" when the transistor 280 is off and as a noninverting amplifier with a gain "1" when the transistor 280 is on.

Accordingly, the op-amp 278 acts either as a noninverting or inverting amplifier depending on the on-off operation of the transistor 274, and the polarity of control signal VC changes correspondingly. This allows the track jump direction to be switched.

The output signal of the op-amp 278 is sent to the comparator unit 13 as a set speed signal VC.

In FIG. 7, when the sum of the control signal VC and detected speed signal VOT that is received by the op-amp 81 is greater than the reference voltage VR, the op-amp 81 generates a negative output. This causes the op-amp 89 to produce a positive output, the transistor 91 to turn on, and the op-amp 93 to function as a noninverting amplifier.

As a result, the output of the op-amp 93 becomes negative.

If the op-amp 93 produces a "0" output (the same value as the reference voltage VR), no current flows through the resistor 115.

If the op-amp 93 produces a negative output, the output of the op-amp 103 becomes positive, which then causes the transistor 105 to turn on, and current to flow through the resistor 115. Since the resistors 101 and 109 are given an equal resistance, the output voltage of the op-amp 93 and the terminal voltage across the resistor 115 are held equal, thereby maintaining a stable performance.

When the transistor 105 is turned on, current flows through the drive coils 47a and 47b in accordance with the output of the exclusive OR gates 117a, 117b, and the motor is thereby rotated.

Upon rotation of the motor, a rotation speed signal including the direction of rotation is produced as the detected speed signal VOT of the op-amps 71a, 71b. This speed signal VOT is added to the control signal VC and applied to the op-amp 81.

The control signal VC varies depending on the output value of the counter 25 as described previously, so does the speed of rotation of the rotary motor 5 vary in accordance with the control signal VC as shown in FIG. 14.

This operation of the counter as applied to the block diagram in FIG. 1 is such that a preset value substitutes for the operation of the reference setting unit 19; the down-counting operation substitutes for the operation of the distance detection unit 9; and the contents of the counter indicate the output of the comparator unit 17. The counter contains binary digital data, which must then be applied to the D/A conversion unit 206. The D/A conversion unit 206 produces an output that is the difference between the output of the reference setting unit 19 and that of the distance detection unit 9.

FIGS. 15 and 16 show test data indicating the count pulse signal FG and the detected speed signal VO when the track jump direction has been switched. As shown in FIG. 15, upon rotation of the motor in a certain direction, the detected motor speed signal became "0" within ca. 220 msec, and the motor was stopped at a desired position and thus the head was located on the predetermined track. Similarly, as shown in FIG. 16, when the motor rotation was reversed, the motor was stopped within ca. 270 msec.

FIGS. 27 to 30 are charts recorded during a test showing waveforms of output signals at respective points of the speed detection unit 7. In the test, the magnet 49 was rotated in two directions CW, CCW.

FIG. 27 shows waveforms of the signals VC1, VC2 obtained from the generators coils 31a, 31b.

Figure 28:
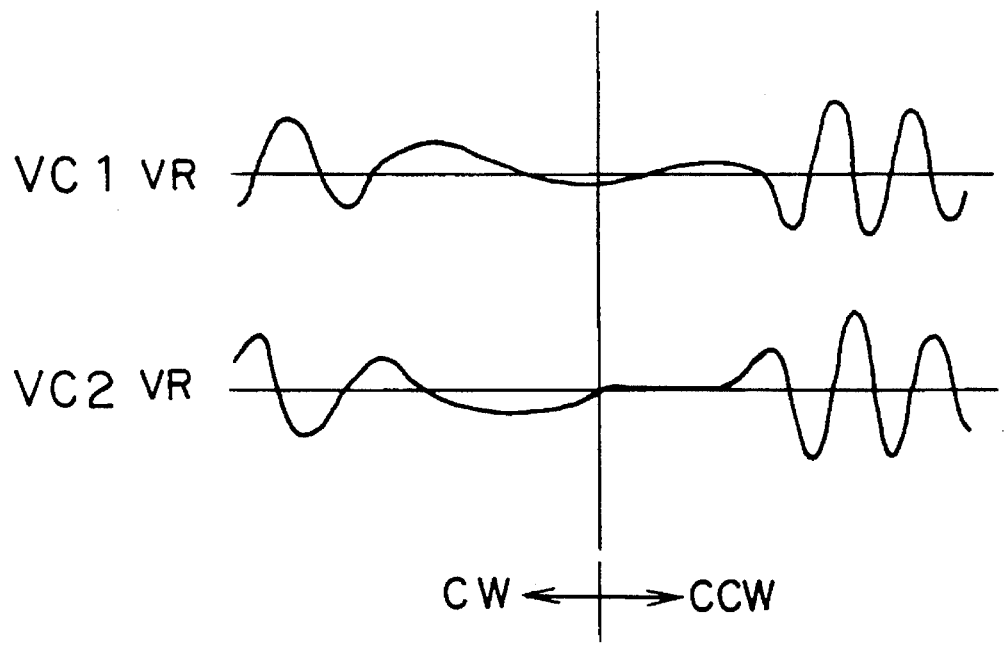

FIG. 28 shows waveforms of the output signal VC2 and the output signal VT2 of the generator coil 31b and the op-amp 61b, respectively.

Figure 29:
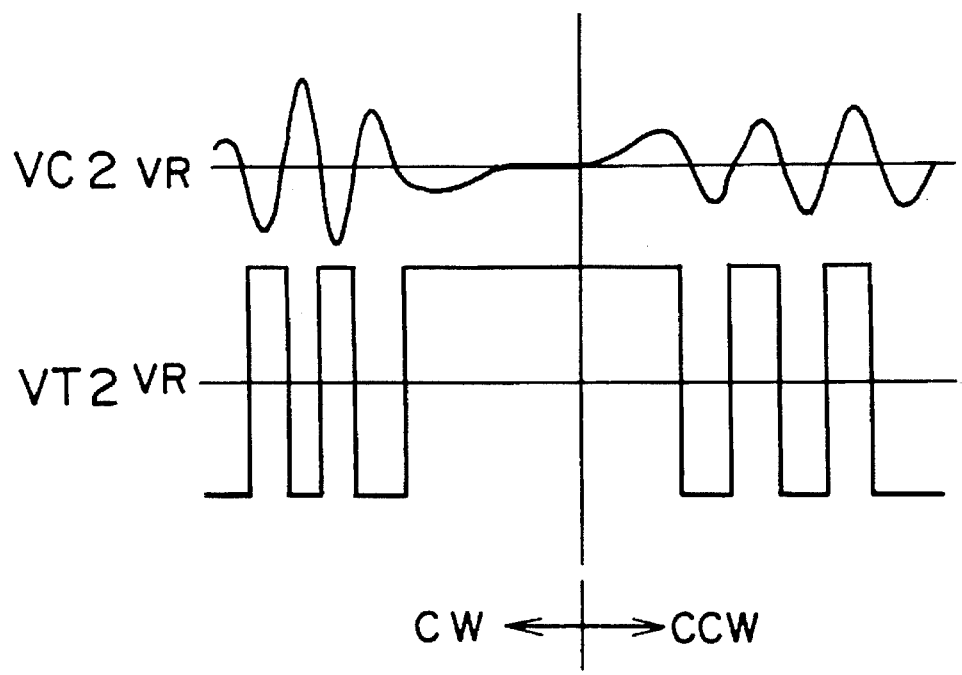

FIG. 29 shows waveforms of the output signals VC2, VG2 of the coil 31b and the op-amp 71b, respectively.

FIG. 30 shows waveforms of the output signal VT2 of the op-amp 61b and the output signal VOT.

As shown in FIG. 30, when the direction of the rotation is CW, the output signal VOT becomes negative, while when the direction of rotation is CCW, the output signal is positive. That is, the polarity of signal VOT switches depending on the direction of rotation of the magnet. Since a voltage corresponding to the rotation of the magnetic yoke 51 is also generated, the amount of rotation of the magnetic yoke 51 can be detected.

Hence, this speed detection unit 7 can detect even the direction of rotation.

Since no diodes are used, the speed detection unit 7 is also suitable for detection of very low speeds.

FIG. 17 shows waveforms of signals at respective units of the comparator unit 17. The differentiating circuit 146 receives a signal VT1 and produces a signal Vd.

The RS flip-flop 152 receives the signal Vd at its set terminal and the signal Vμ sent from the controller 15 at its reset terminal, and generates a signal STOP.

As shown in the same figure, the differentiating circuit has the signal VT1 applied while the motor is in rotation, so that the signal STOP switches its on-off operation to cause the controller 15 to read the STOP signal at a read timing shown in the figure and confirms that the signal STOP is at "H" level.

On the other hand, the signal STOP is always at "L" level when the motor is stopped. Therefore, the signal STOP read by the controller 15 at a read timing while the motor is in halt is at "L" level, whereby the controller 15 is informed of the stoppage of the motor. Also, to inform the controller 15 of the completion of the track jump operation, a signal S9 or S10 shown in FIG. 13 may be monitored.

Thus, this embodiment allows a high speed track jump operation to be performed with its rotary motor that reduces the influence in the gravitational direction and thus does not limit the installation position.

No use of the data read by the head allows the track jump operation to be undisturbed by defects of the disc and the like. Furthermore, absence of mechanical brushes contributes to increasing durability. The motor speed is subjected to a rapid acceleration at the start and is held substantially zero at the target position; this not only prevents the head from overshooting but also allows a high-speed and accurate track jump.

Contribution to the high-speed, accurate track jump is made also by the method in which no disc tracking signal is employed in performing the distance detection. A feedback control applied to the motor speed further permits a smooth, stable, and low-speed transfer of the head.

Figure 18:
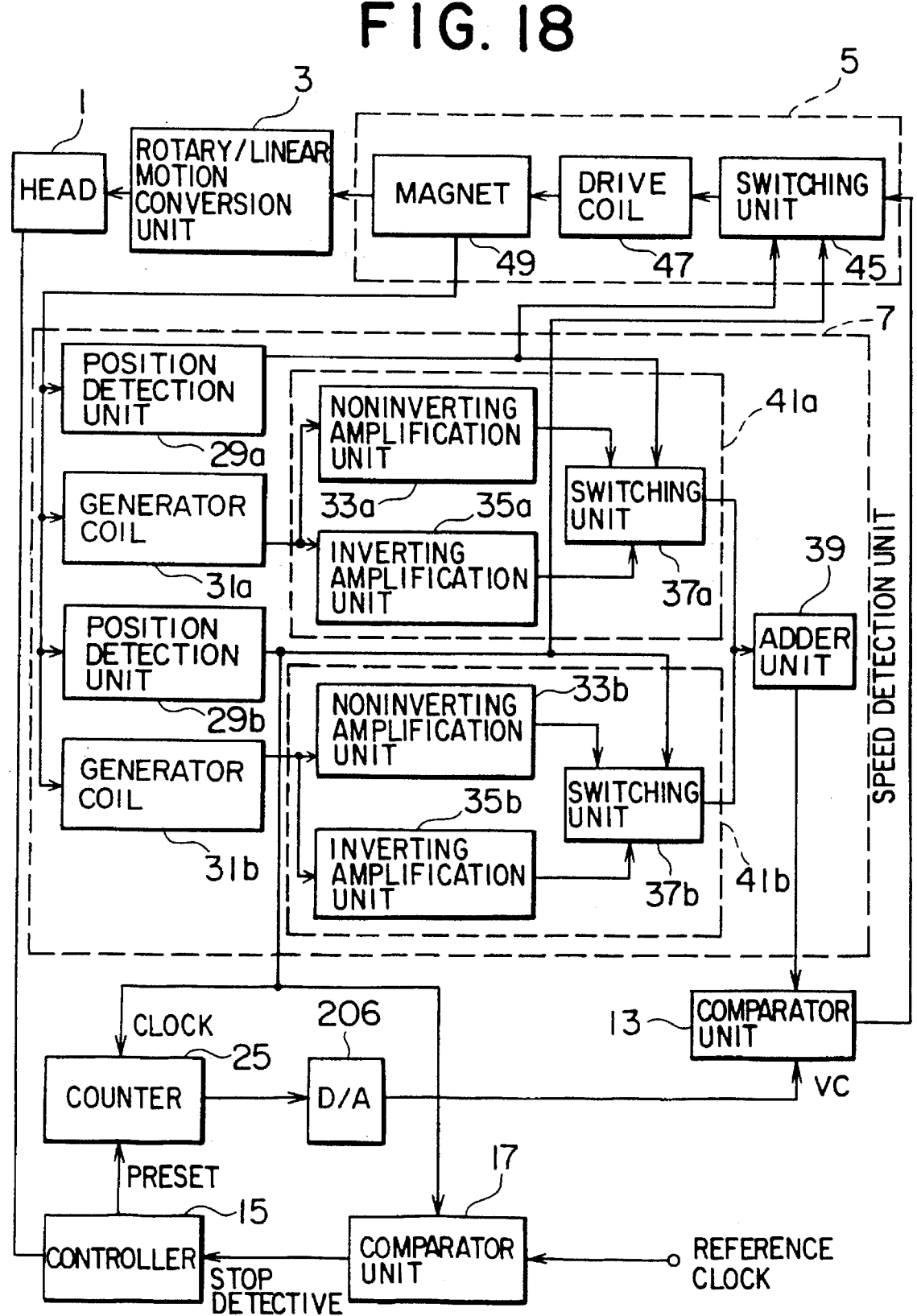
FIG. 18 is a diagram showing a modification of the first embodiment.

As shown in FIG. 18, the input signal of the comparator unit 17 may be obtained from the speed signal. Furthermore, although the output signal of the comparator unit 17 is used for stop detection in the previously described embodiment, the output signal of the comparator unit 21 may be applied to the controller 15 to be used as the stop detection signal. This is possible because the comparator 21 produces a "0" output when the track jump has been completed.

Referring to FIGS. 1 to 3, reference letter A denotes a speed control motor. In the speed control motor A, the motor drive signal and the speed signal are electrically isolated, thereby allowing stable speed control of the track jump operation to be performed. Use of a brushless speed detector may improve the durability.

Figure 19:
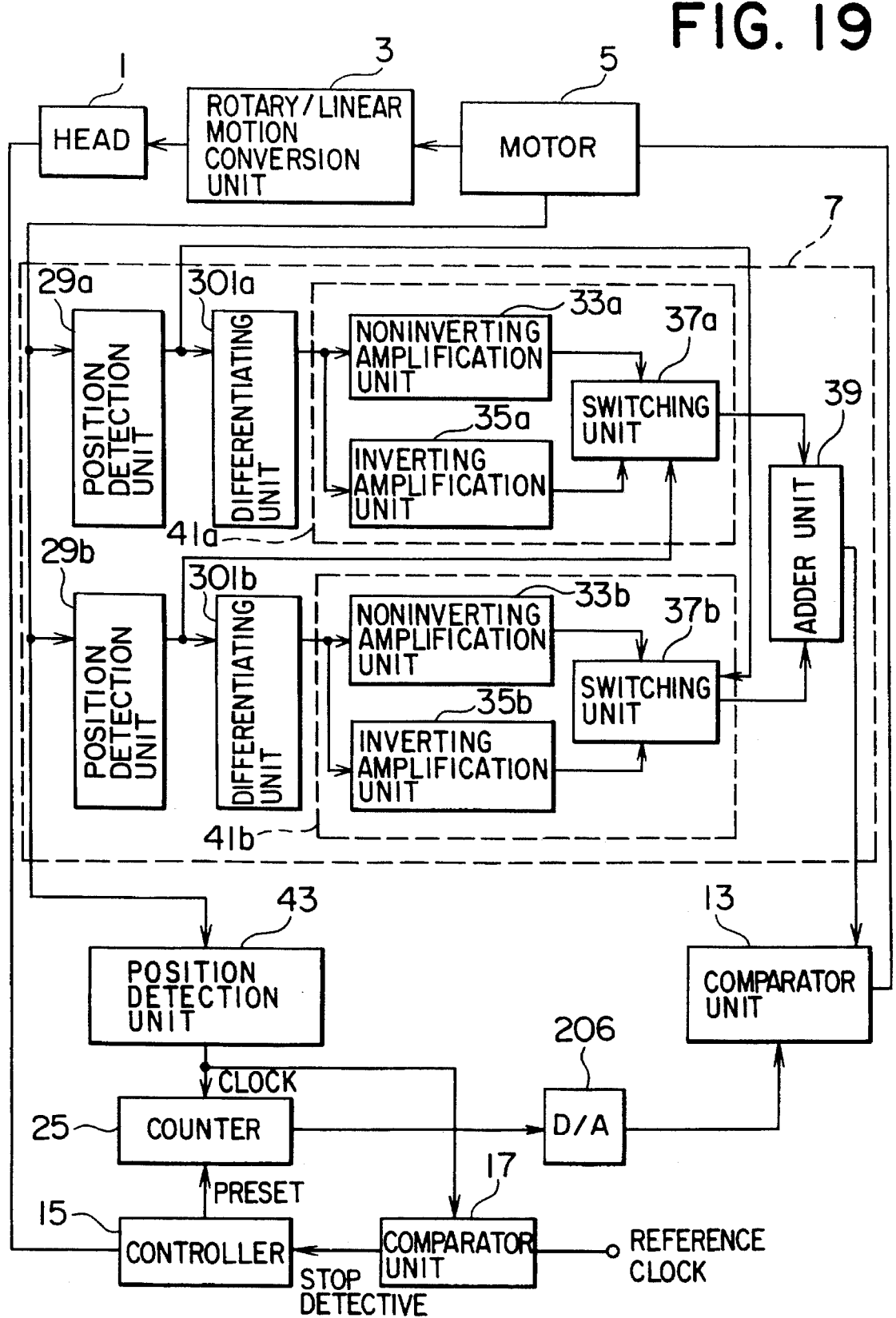
FIG. 19 is a block diagram showing the configuration of a track jump control circuit of a second embodiment.

A second embodiment of this invention will next be described. FIG. 19 is a block diagram showing the configuration of a track Jump control circuit according to the second embodiment. The major features of this embodiment is that a signal obtained by differentiating the output of the position detection unit is subjected to either inversion or noninversion and then addition to obtain a detected speed signal.

Figure 20:
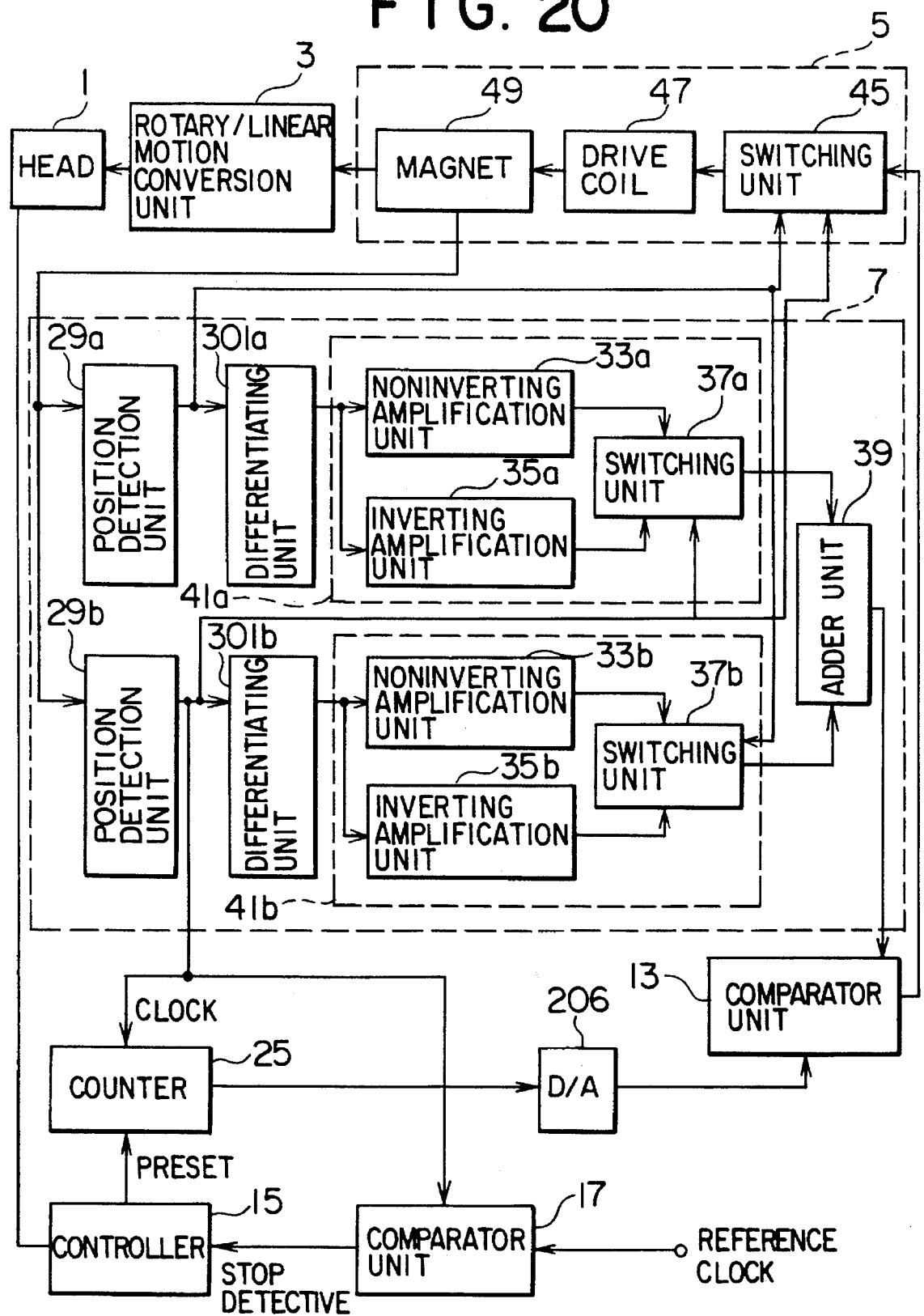
FIG. 20 is a block diagram showing the configuration of a track jump control circuit in which the magnet 27 and position detector of the speed detection unit 7 of FIG. 19 are shared with the rotary motor 5 and the counter 25 for generating a clock signal, respectively.

FIG. 20 shows a track jump control circuit in which the magnet 27 in FIG. 19 is shared with the rotary motor 5; the position detector is shared with the counter 25 for generating a clock signal; and the signals of the position detection units 29a, 29b are shared with the input of the switching unit 45. The embodiment shown in FIG. 20 will hereunder be described.

Figure 21:
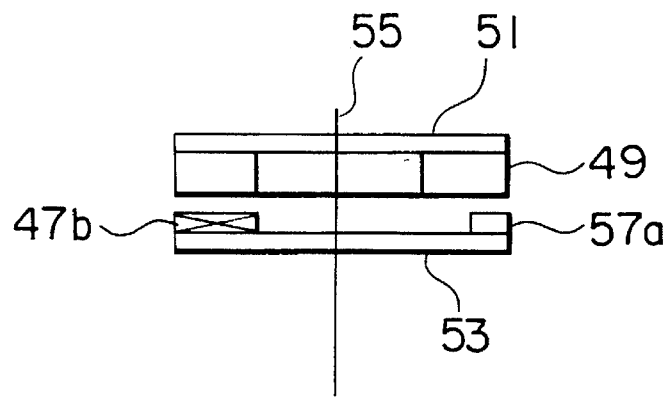
FIG. 21 is an elevation adjacent to the magnet 1, drive coil, and Hall element.
Figure 22:
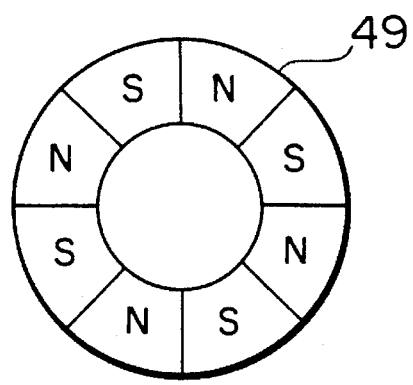
FIG. 22 is a plan view of the magnet 1.
Figure 23:
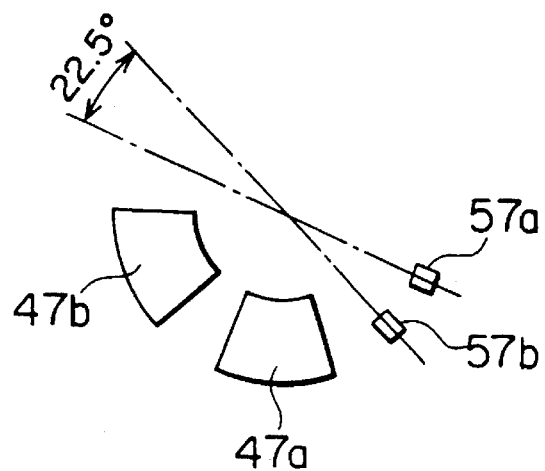
FIG. 23 is a diagram showing the coil and Hall element provided on the magnetic yoke 17.

FIG. 21 is an elevation of a magnet 49 and its vicinity; FIG. 22 is a plan view of the magnet 49; and FIG. 23 is a diagram showing Hall elements and drive coils arranged on a magnetic yoke 53.

Figure 24:
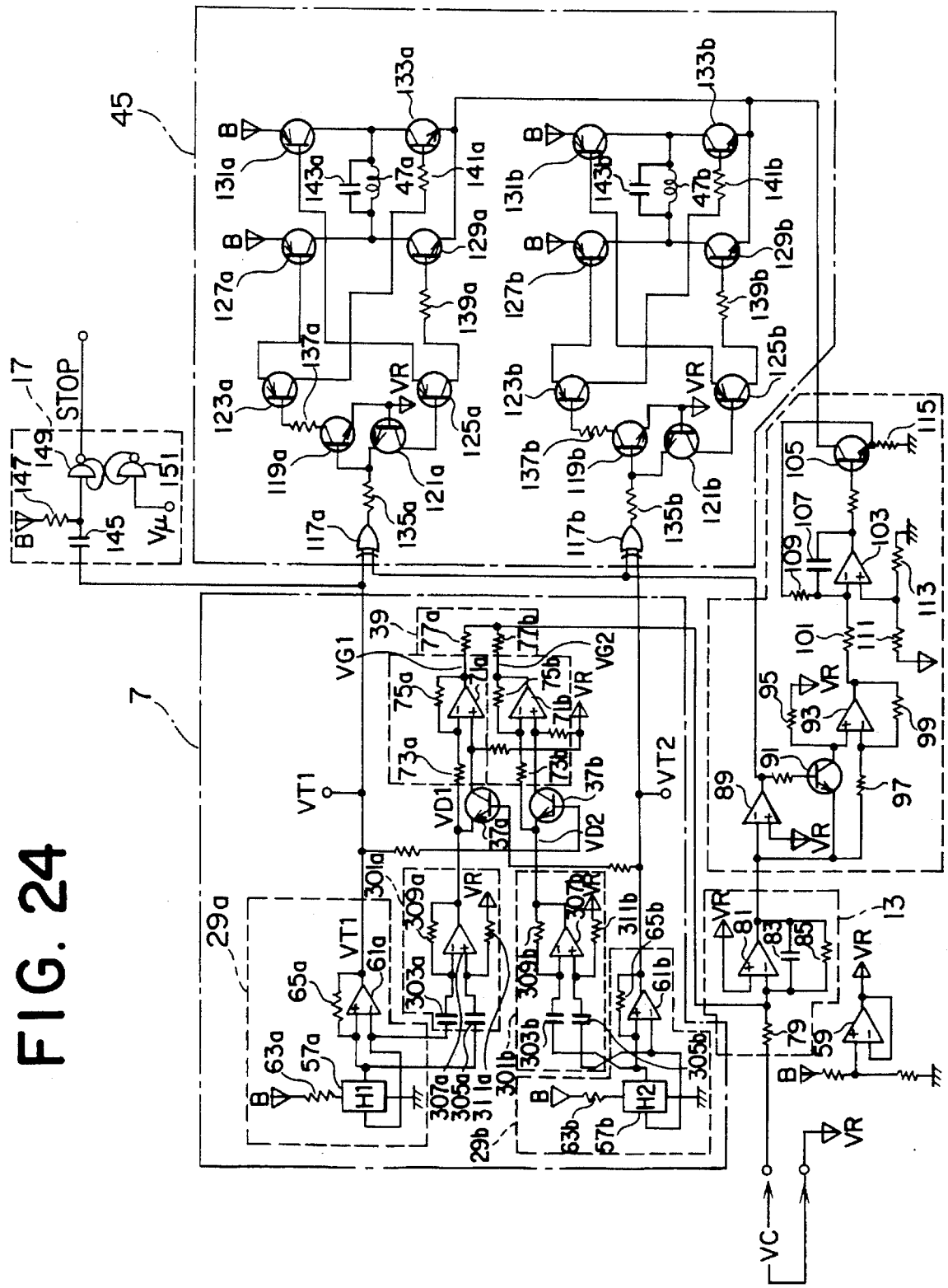
FIG. 24 is a circuit diagram of the second embodiment.

FIG. 24 is a circuit diagram showing the configuration of this track jump control circuit.

In the second embodiment, the elements performing the same function as the speed control motor in the first embodiment will be given the same reference numerals to avoid repetition of their descriptions.

As shown in FIG. 20, the output signal of the position detection unit 29a is applied to the differentiating unit 301a and the switching unit 45.

The differentiating unit 301a differentiates the output signal of the position detection unit 29a and then applies this signal to the noninverting amplifier 33a or the inverting amplifier 35a.

Similarly, the output signal of the position detection unit 29b is fed to the differentiating unit 301b and the switching unit 45.

The switching unit 37a selects one of the outputs of the noninverting amplifier 33a or the inverting amplifier 35a and applies that signal to the adder unit 39.

Unlike in the first embodiment, there are no generator coils 31a, 31b in this second embodiment. On the magnetic yoke 53 are the Hall elements 57a, 57b fixed so as to form a central angle of 22.5°, and the drive coils 47a, 47b are also fixed. The magnetic yoke 53 and the magnet 49 are arranged in the same manner as in the first embodiment.

As shown in FIG. 24, the differentiating unit 301a includes capacitors 303a, 305a, an op-amp 307a, and resistors 309a, 311a. This differentiating unit 301b also has the same arrangement as in the first embodiment.

An operation of the second embodiment will next be outlined. The differentiating unit 301a, 301b differentiate the output signals of the position detection units 29a, 29b and apply the differentiated signals to the noninverting amplifier 33a, 33b or the inverting amplifiers 35a, 35b as speed signals. Since the outputs produced by the op-amps 307a, 307b are differentiated signals, their phase is shifted 90° ahead of the signals VT1, VT2. As a result, the output signal of the op-amp 61b is used as a signal for controlling the transistor 37a, while the output signal of the op-amp 61a is used as a signal for controlling the transistor 37b.

Other that the above, the operation of the second embodiment is the same as that of the first embodiment. Therefore, the waveforms of signals at respective units are the same as those shown in FIGS. 10 to 13.

Although in FIG. 1 it is so arranged that the counter 25 substitutes for the distance detection unit 9, the output signal of the speed detection unit 7 may be integrated for distance detection.

The distance from the head may be used as a reference for distance detection.

Figure 25:
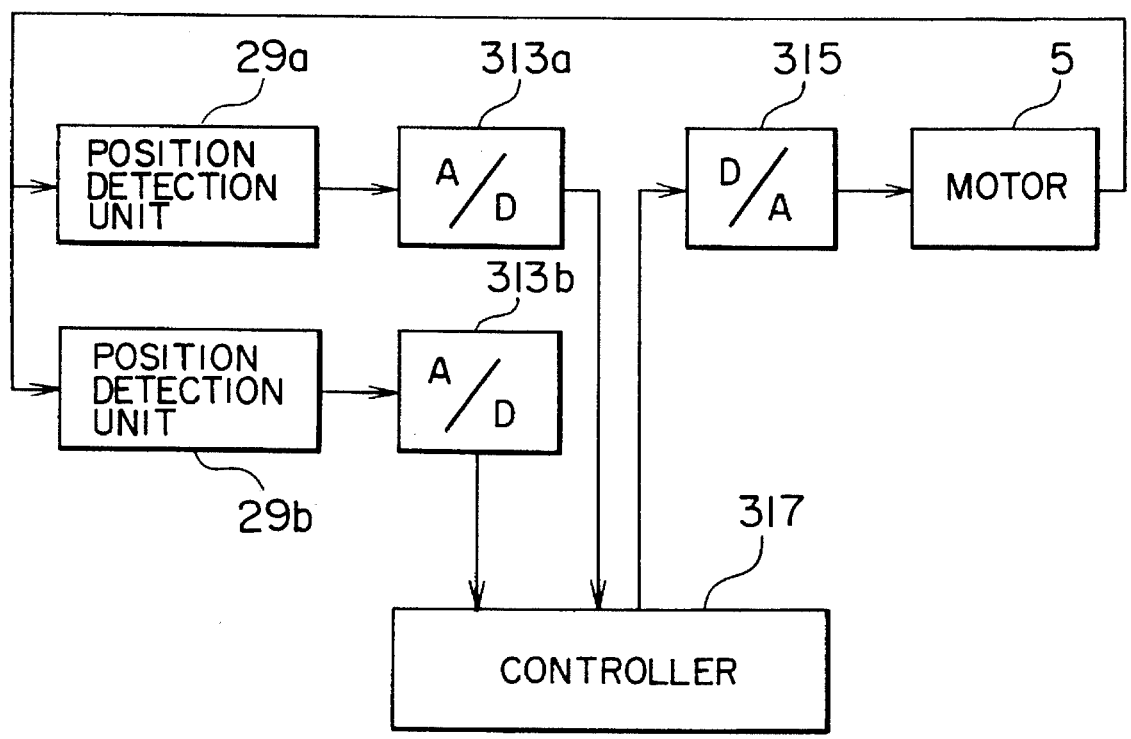
FIG. 25 is a block diagram showing the configuration of a track jump control circuit of another embodiment.

FIG. 25 is a block diagram showing the configuration of a track jump control circuit according to still another embodiment. This track jump control circuit comprises a controller 317 made up of a digital signal processor, which integrate the main portion of the speed detection unit 7, the speed setting unit 11, and the comparator unit 13 in FIG. 1. As a unit for processing digital signals, the controller 317 is provided with A/D converters 313a, 313b and a D/A converter 315 as shown in FIG. 25.

As described above in detail, this track jump control circuit allows a track jump operation that is durable, accurate, and quick in any installation position.

An operation of the speed detection unit 7 will now be described in detail.

FIG. 26 show waveforms of signals at respective points when the magnetic yoke 51 is rotated only in one direction. FIGS. 26(a) and (b) show outputs H1, H2 of the Hall elements 57a, 57b, which exhibit sine waves and are 90° out of phase as shown in the figure.

FIGS. 26(c) and (d) show waveforms of the output signals VT1, VT2 of the op-amps 61a, 61b.

FIGS. 26(e) and (f) show waveforms of the output signals VD1, VD2 of the op-amps 307a, 307b of the differentiator. As shown in the figure, the voltage signals VD1, VD2 are also sinusoidal.

The output signal H1 of the Hall element 57a has its waveform shaped by the op-amp 61a to produce the signal VT1 (FIG. 26(c)), whereas the output signal H2 of the Hall element 57b has its waveform shaped by the op-amp 61b to produce the signal VT2 (FIG. 26(d)).

Here, it is supposed that the resistors 73a, 75a, 73b, 75b have an equal resistance. The output signal VT1 of the op-amp 61a is applied to the base of the transistor 37b. This means that when the signal VT1 is "1", the transistor 37b is turned on and the op-amp 71b acts as a noninverting amplifier with a gain "1". As a result, the op-amp 71b generates an output VG2 whose polarity is the same as that of the signal VD2 during this period.

When the signal VT1 is "0", the transistor 37b is turned off and the op-amp 71b functions as an inverting amplifier with a gain "−1". As a result, the op-amp 71b generates an output VG2 whose polarity is opposite to that of the signal VD2 during this period.

The output VT2 of the op-amp 51b is applied to the base of the transistor 37a. This means that when the signal VT2 is "1", the transistor 37a is turned on and the op-amp 71a acts as a noninverting amplifier with a gain "1". As a result, the op-amp 71a generates an output VG1 whose polarity is the same as that of the signal VD1 during this period.

When the signal VT2 is "0", the transistor 37a is turned off and the op-amp 71a functions as an inverting amplifier with a gain "−1". As a result, the op-amp 71a generates an output VG1 whose polarity is opposite to that of the signal VD1 during this period.

The output signals VG1, VG2 of the op-amps 71a, 71b are synthesized to form an output signal VOT. As shown in FIG. 26 (i), this signal VOT is substantially flat in waveform. The polarity of signal VOT is negative.

On the other hand, when the magnetic yoke 51 is rotated in the direction opposite to that previously described, the signal VOT is obtained as shown in FIG. 27, whose polarity, in this case, is positive.

Moreover, as the rotation of the magnetic yoke 51 is increased, the output signal VOT that has an absolute value corresponding to such a speed is obtained.

FIGS. 32 to 37 are charts recorded during a test showing waveforms of output signals at respective units of the speed detection unit 7 of FIGS. 20 and 24.

Figure 32:
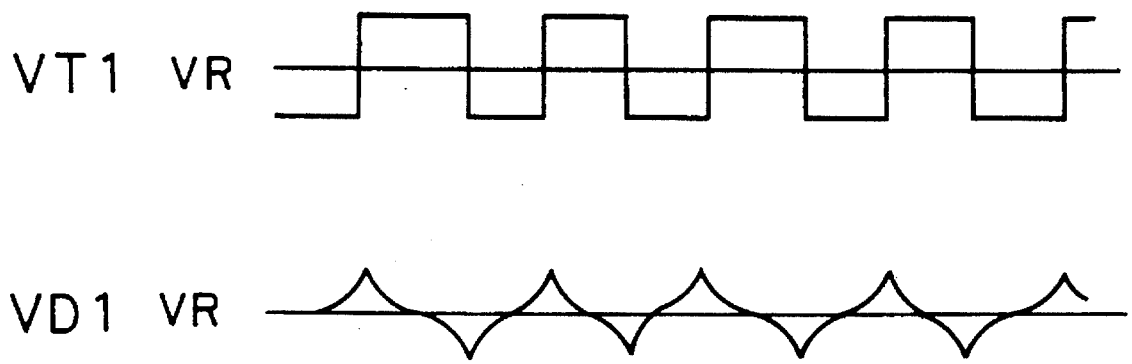
Figure 33:
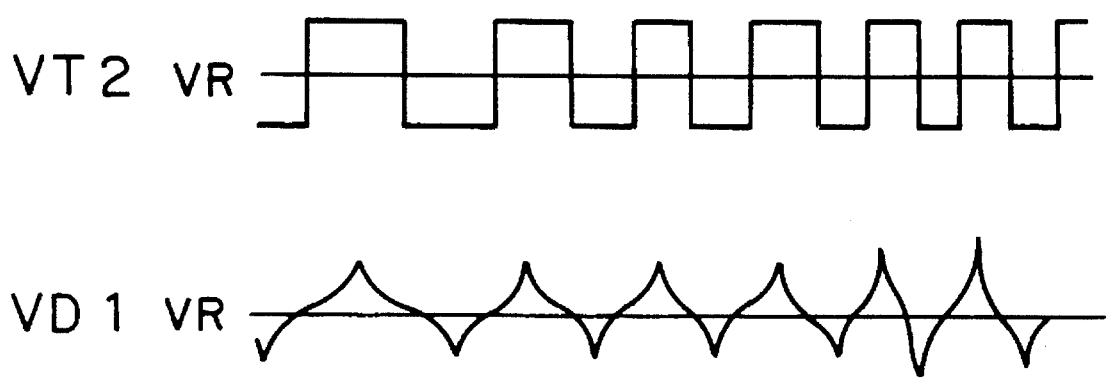

FIG. 32 show waveforms of signals VT1 and VD2; FIG. 33 show waveforms of signals VT2 and VD1; FIG. 34 show waveforms of signals VD2 and VD1; FIG. 35 show waveforms of signals VT2 and VG1; FIG. 36 show waveforms of signals VG2 and VG1; FIG. 37 show waveforms of signals VT1 and VOT.

As shown in FIG. 37, the output signal VOT, whose polarity changes depending on the direction of rotation of the magnetic yoke 51, serves to detect the direction of rotation. This signal VOT also allows the speed of rotation of the magnetic yoke 51 to be detected with its output voltage that corresponds to the number of revolutions of the magnetic yoke 51.

The differentiated signals obtained in FIG. 34 do not exhibit since waves due to the arrangement of the Hall elements 57a, 57b. If they are arranged appropriately, it is possible to make these signals produce waveforms that are more sinusoidal. Asymmetry of the rise and fall of the waveform is caused by hysteresis of the Hall elements 57a, 57b.

Hence, the speed detection unit 7 allows not only the direction of rotation but also very low speeds to be detected.

What is claimed is:

1. A track jump control circuit for controlling the movement of a head over a rotary disk, comprising:

a head for reproducing an information signal from said rotary disk;

a rotary motor which drives said head and whose drive force is controlled is accordance with an input signal;

distance detecting means for detecting a distance along which said head moves by an electrical signal, the electrical signal produced corresponding to a mechanical movement, the mechanical movement performed corresponding to the rotation of said rotary motor means for detecting a speed of rotation of said rotary motor responsive to an output signal of said distance detecting means;

means for setting a speed of movement of said head in accordance with a signal output from said distance detection means; and means for comparing a speed detected by said speed detection means with a speed set by said speed setting means to produce an output signal as said input signal to said rotary motor.

2. A track jump control circuit according to claim 1, wherein said distance detection means includes a counter for counting a pulse corresponding to a distance along which said head moves.

3. A track jump control circuit according to claim 1, wherein said distance detection means detects a distance along which said head moves in accordance with a position of said head.

4. A track jump control circuit according to claim 1, wherein said distance detection means comprises, means for detecting a speed of movement of said head; and means for integrating a detected head movement speed.

5. A track jump control circuit according to claim 1, wherein said speed detection means is not in contact with said motor.

6. A track jump control circuit according to claim 1, wherein said speed detection means comprises;
- a magnet which rotates in association with said rotary motor;
- a plurality of fixed coils, each of which generates an electromagnetic force as said magnet rotates;
- means for detecting a rotational position of said magnet to produce a position signal;
- means provided correspondingly to each of said plurality of coils for inverting an electromagnetic force generated by each of said plurality of coils;
- noninverting means provided correspondingly to each of said plurality of coils for outputting an electromagnetic force generated by each of said plurality of coils without inverting it;
- a plurality of means provided correspondingly to each of said plurality of coils for producing an output by switching the output signals of said inverting means and said noninverting means in accordance with said position signal; and
- means for producing an output to said comparing means by adding the outputs of said plurality of switching means.

7. A track jump control circuit according to claim 1, wherein said speed detection means comprises:
- a plurality of fixed coils, each of which generates an electromagnetic force as a magnet of said rotary motor is rotated;
- means for detecting a rotational position of said magnet to produce a position signal;
- means provided correspondingly to each of said plurality of coils for inverting an electromagnetic force generated by each of said plurality of coils;
- noninverting means provided correspondingly to each of said plurality of coils for outputting an electromagnetic force generated by each of said plurality of coils without inverting it;
- a plurality of means provided correspondingly to each of said plurality of coils for producing an output by switching the output signals of said inverting means and said noninverting means in accordance with said position signal; and
- means for producing an output to said comparing means by adding the outputs of said plurality of switching means.

8. A track jump control circuit for controlling the movement of a head over a rotary disk, comprising:
- a head for reproducing an information signal from said rotary disk;
- a rotary motor which drives said head and whose drive force is controlled in accordance with an input signal;
- distance detecting means for detecting a distance along which said head moves by an electrical signal, the electrical signal produced corresponding to a mechanical movement, the mechanical movement performed corresponding to the rotation of said rotary motor;
- means for detecting a speed of rotation of said rotary motor, said speed detection means is electrically isolated from said rotary motor responsive to an output signal of said distance detecting means;
- means for setting a speed of movement of said head in accordance with a signal output from said distance detection means; and
- means for comparing a speed detected by said speed detection means with a speed set by said speed setting means to produce an output signal as said input signal to said rotary motor.

9. A track jump control circuit according to claim 8, wherein said distance detection means includes a counter for counting a pulse count corresponding to a distance along which said head moves.

10. A track jump control circuit according to claim 8, wherein said distance detection means detects a distance along which said head moves in accordance with a position of said head.

11. A track jump control circuit according to claim 8, wherein said distance detection means comprises,
- means for detecting a speed of movement of said head; and
- means for integrating a detected head movement speed.

12. A track jump control circuit according to claim 8, wherein said speed detection means comprises;
- a magnet which rotates in association with said rotary motor;
- a plurality of fixed coils, each of which generates an electromagnetic force as said magnet rotates;
- means for detecting a rotational position of said magnet to produce a position signal;
- means provided correspondingly to each of said plurality of coils for inverting an electromagnetic force generated by each of said plurality of coils;
- noninverting means provided correspondingly to each of said plurality of coils for outputting an electromagnetic force generated by each of said plurality of coils without inverting it;
- a plurality of means provided correspondingly to each of said plurality of coils for producing an output by switching the output signals of said inverting means and said noninverting means in accordance with said position signal; and
- means for producing an output to said comparing means by adding the outputs of said plurality of switching means.

13. A track jump control circuit according to claim 8, wherein said speed detection means comprises:
- a plurality of fixed coils, each of which generates an electromagnetic force as a magnet of said rotary motor is rotated;
- means for detecting a rotational position of said magnet to produce a position signal;
- means provided correspondingly to each of said plurality of coils for inverting an electromagnetic force generated by each of said plurality of coils;
- noninverting means provided correspondingly to each of said plurality of coils for outputting an electromagnetic force generated by each of said plurality of coils without inverting it;
- a plurality of means provided correspondingly to each of said plurality of coils for producing an output by switching the output signals of said inverting means and said noninverting means in accordance with said position signal; and
- means for producing an output to said comparing means by adding the outputs of said plurality of switching means.

14. A speed control motor comprising:
- a motor whose drive force is controlled in accordance with an input signal;

rotating speed detection means for detecting a speed of rotation of said motor by an electrical signal, the electrical signal produced corresponding to a mechanical movement, the mechanical movement performed corresponding to the rotation of said motor; and means for comparing a speed signal detected by said rotation speed detection means with a reference signal to produce an error signal as said input signal to said motor;

wherein said rotation speed detection means comprises:

a magnet which rotates in association with said rotary motor;

a plurality of fixed coils, each of which generates an electromagnetic force as said magnet rotates;

means for detecting a rotational position of said magnet to produce a position signal;

inverting means provided correspondingly to each of said plurality of coils for inverting said electromagnetic force generated by each of said plurality of coils;

noninverting means provided correspondingly to each of said plurality of coils for outputting an electromagnetic force generated by each of said plurality of coils without inverting means;

a plurality of means provided correspondingly to each of said plurality of coils for producing an output by switching the output signals of said inverting means and said noninverting means in accordance with said position signal; and means for producing an output to said comparing means by adding the outputs of said plurality of switching means.

15. A speed control motor comprising:

a motor whose drive force is controlled in accordance with an input signal;

rotating speed detection means for detecting a speed of rotation of said motor by an electrical signal, the electrical signal produced corresponding to a mechanical movement, the mechanical movement performed corresponding to the rotation of said motor; and means for comparing a speed signal detected by said rotation speed detection means with a reference signal to produce an error signal as said input signal to said motor;

wherein said rotation speed detection means comprises:

a plurality of fixed coils, each of which generates an electromagnetic force as a magnet of said motor is rotated;

means for detecting a rotational position of said magnet to produce a position signal;

inverting means provided correspondingly to each of said plurality of coils for inverting said electromagnetic force generated by each of said plurality of coils;

noninverting means provided correspondingly to each of said plurality of coils for outputting an electromagnetic force generated by each of said plurality of coils without inverting means;

a plurality of means provided correspondingly to each of said plurality of coils for producing an output by switching the output signals of said inverting means and said noninverting means in accordance with said position signal; and means for producing an output to said comparing means by adding the outputs of said plurality of switching means.

\* \* \* \* \*

UNITED STATES PATENT AND TRADEMARK OFFICE
CERTIFICATE OF CORRECTION

PATENT NO. : 5,521,891
DATED : May 28, 1996
INVENTOR(S) : NAKANE

It is certified that error appears in the above-identified patent and that said Letters Patent is hereby corrected as shown below:

Column 16, line 38, change "is" (second occurrence) to --in--;

line 43, after "rotary motor" insert --;--.

Column 19, line 1, change "rotating" to --rotation--.

Column 20, line 1, change "rotating" to --rotation--.

Signed and Sealed this

Fifteenth Day of February, 2000

*Attest:*

Q. TODD DICKINSON

*Attesting Officer*     *Commissioner of Patents and Trademarks*